United States Patent
Naresh et al.

(10) Patent No.: US 10,223,118 B2
(45) Date of Patent: Mar. 5, 2019

(54) PROVIDING REFERENCES TO PREVIOUSLY DECODED INSTRUCTIONS OF RECENTLY-PROVIDED INSTRUCTIONS TO BE EXECUTED BY A PROCESSOR

(71) Applicant: QUALCOMM Incorporated, San Diego, CA (US)

(72) Inventors: Vignyan Reddy Kothinti Naresh, Morrisville, NC (US); Shivam Priyadarshi, Morrisville, NC (US); Raguram Damodaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 15/079,875

(22) Filed: Mar. 24, 2016

(65) Prior Publication Data

US 2017/0277536 A1   Sep. 28, 2017

(51) Int. Cl.
*G06F 9/30* (2018.01)
*G06F 9/38* (2018.01)

(52) U.S. Cl.
CPC .......... *G06F 9/3016* (2013.01); *G06F 9/381* (2013.01); *G06F 9/3802* (2013.01); *G06F 9/3808* (2013.01); *G06F 9/3867* (2013.01)

(58) Field of Classification Search
None
See application file for complete search history.

(56) References Cited

U.S. PATENT DOCUMENTS

| 3,466,613 | A | * | 9/1969 | Schlaeppi | G06F 9/381 711/125 |
|---|---|---|---|---|---|
| 7,873,820 | B2 | | 1/2011 | Knoth | |
| 2003/0120906 | A1 | | 6/2003 | Jourdan et al. | |
| 2005/0223364 | A1 | | 10/2005 | Peri et al. | |

(Continued)

OTHER PUBLICATIONS

International Search Report and Written Opinion for PCT/US2017/020605, dated Jun. 13, 2017, 12 pages.

(Continued)

*Primary Examiner* — George Giroux
(74) *Attorney, Agent, or Firm* — W&T/Qualcomm

(57) ABSTRACT

Providing references to previously decoded instructions of recently-provided instructions to be executed by a processor is disclosed herein. In one aspect, a low resource micro-operation controller is provided. Responsive to an instruction pipeline receiving an instruction address, the low resource micro-operation controller is configured to determine if the received instruction address corresponds to an instruction address in short history table. Short history table includes instruction addresses of recently-provided instructions having micro-ops in a post-decode queue. If the received instruction address corresponds to an instruction address in short history table, the low resource micro-operation controller is configured to provide reference (e.g., pointer) to the fetch stage that corresponds to an entry in the post-decode queue in which the micro-ops corresponding to the instruction address are stored. Responsive to the decode stage receiving the reference, the low resource micro-operation controller is configured to provide the micro-ops from the post-decode queue for execution.

30 Claims, 19 Drawing Sheets

(56) References Cited

U.S. PATENT DOCUMENTS

| | | |
|---|---|---|
| 2006/0212685 A1* | 9/2006 | Raghavan ........... G06F 9/30036 |
| | | 712/225 |
| 2009/0113191 A1 | 4/2009 | Hall et al. |
| 2010/0138610 A1* | 6/2010 | Rappoport .......... G06F 12/0864 |
| | | 711/125 |
| 2012/0124301 A1 | 5/2012 | Hardage et al. |
| 2013/0339700 A1 | 12/2013 | Blasco-Allue et al. |
| 2014/0136822 A1 | 5/2014 | Suggs et al. |
| 2014/0189306 A1 | 7/2014 | Merten et al. |
| 2014/0189331 A1 | 7/2014 | Lipshits et al. |
| 2014/0208085 A1* | 7/2014 | Chung .................... G06F 9/325 |
| | | 712/241 |
| 2015/0012726 A1 | 1/2015 | Combs et al. |
| 2015/0205725 A1 | 7/2015 | Al-Otoom et al. |
| 2016/0092230 A1* | 3/2016 | Chen ....................... G06F 9/381 |
| | | 712/241 |

OTHER PUBLICATIONS

Bellas, N. et al., "Energy and Performance Improvements in Microprocessor Design using a Loop Cache," 1999 International Conference on Computer Design (ICCD '99), IEEE, Oct. 10-13, 1999, pp. 378-383.

Solomon, B. et al., "Micro-Operation Cache: A Power Aware Frontend for Variable Instruction Length ISA," IEEE Transactions on Very Large Scale Integration (VLSI) Systems, vol. 11, No. 5, IEEE, Oct. 2003, pp. 801-811.

International Preliminary Report on Patentability for PCT/US2017/020605, dated Feb. 26, 2018, 6 pages.

* cited by examiner

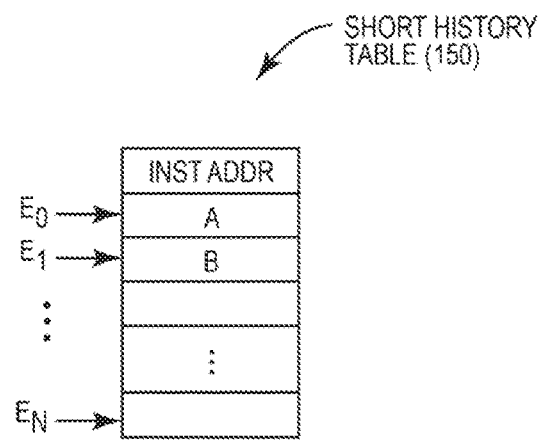
FIG. 3
FIG. 4A
FIG. 5A
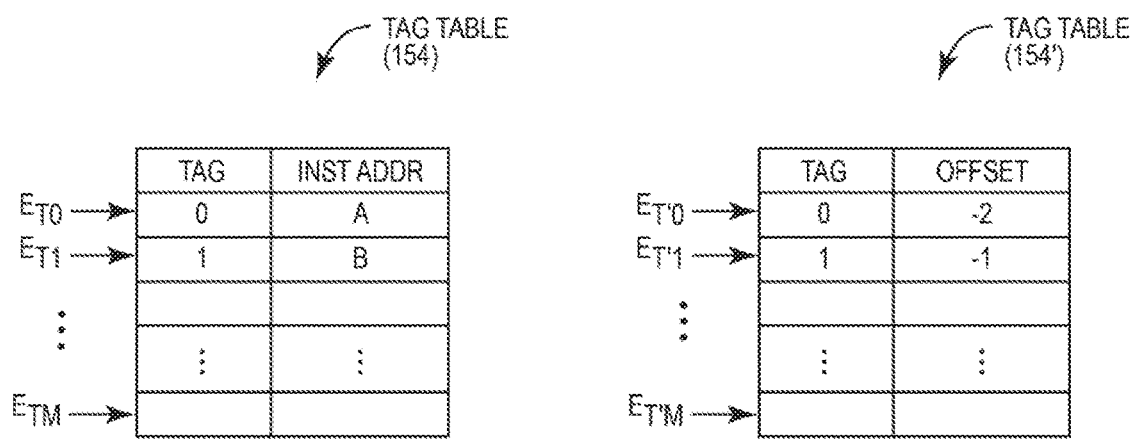
FIG. 4B
FIG. 5B

PROVIDING REFERENCES TO PREVIOUSLY DECODED INSTRUCTIONS OF RECENTLY-PROVIDED INSTRUCTIONS TO BE EXECUTED BY A PROCESSOR

BACKGROUND

I. Field of the Disclosure

The technology of the disclosure relates generally to instruction pipelining in processors, and more particularly to re-using previously decoded instructions of recently-provided instructions to be executed by a processor.

II. Background

Instruction pipelining is a processing technique whereby the throughput of computer instructions being executed by a processor may be increased. In this regard, the handling of each instruction is split into a series of steps as opposed to each instruction being processed sequentially and fully executed before processing a next instruction. These steps are executed in an instruction pipeline composed of multiple stages. There are several cycles between the time at which an instruction is fetched from memory until the time at which the instruction is actually executed as the instruction flows through various pipeline stages of an instruction pipeline.

Conventionally, the instruction pipeline decodes an instruction after the instruction is fetched in the previous step. An instruction is decoded into a series of shorter operations known as micro-operations or micro-ops. Decoding instructions in this manner causes the instruction pipeline to execute the shorter micro-ops instead of the more complex instructions, which helps to improve instruction pipeline performance. If a processor accesses a particular pattern of instructions multiple times, the instruction pipeline may perform the same fetch and decode steps each time the same pattern of instructions is accessed. In this manner, processors may employ dedicated storage that is configured to store the micro-ops generated when decoding a pattern of instructions. If the processor is instructed to access a pattern of instructions from a given fetch address, the processor may search the dedicated storage for the micro-ops corresponding to the fetch address. If the micro-ops have been previously decoded and stored in the dedicated storage, the micro-ops may be retrieved and supplied from the dedicated storage to the processor, thus avoiding the need to re-fetch and re-decode the pattern of instructions. In this manner, supplying the micro-ops from the dedicated storage rather than through fetching and decoding allows the fetch and decode steps to be temporarily disabled, thus reducing power consumption.

While supplying previously decoded micro-ops from dedicated storage reduces power consumption by temporarily disabling fetching and decoding, retrieving and passing the micro-ops causes corresponding power consumption. For example, the micro-ops are retrieved from the dedicated storage and passed to the processor such that the micro-ops are executed according to the timing of the instruction pipeline. In particular, in response to retrieving micro-ops from the dedicated storage, these micro-ops are passed to corresponding queues in the instruction pipeline until they can be provided to subsequent stages for execution. Thus, it would be advantageous to avoid re-fetching and re-decoding previously decoded instructions while also reducing power consumption corresponding to retrieving and passing micro-ops through an instruction pipeline.

SUMMARY OF THE DISCLOSURE

Aspects disclosed in the detailed description include providing references to previously decoded instructions of recently-provided instructions to be executed by a processor. The previously decoded instructions, also known as micro-operations or micro-ops, are generated during a decode stage of instruction processing. Such micro-ops are stored in a post-decode queue of the decode stage so that the micro-ops can be provided to subsequent stages for execution according to the timing of an instruction pipeline. In this regard, in certain aspects disclosed herein, a low resource micro-operation controller configured to provide references (e.g. pointers) corresponding to previously decoded instructions of recently-provided instructions is provided in a processor. In response to the instruction pipeline receiving an instruction address, before a corresponding instruction is fetched, the low resource micro-operation controller is configured to determine if the received instruction address corresponds to an instruction address stored in a short history table. The short history table includes a list of instruction addresses of recently-provided instructions that have micro-ops stored in the post-decode queue. If the received instruction address corresponds to an instruction address in the short history table, the low resource micro-operation controller is configured to provide a reference to the fetch stage such that the instruction pipeline does not need to fetch and decode the corresponding instruction. The reference corresponds to an entry in the post-decode queue in which the micro-ops corresponding to the instruction address are stored. In response to the decode stage receiving the reference, the low resource micro-operation controller is configured to provide the micro-ops from the post-decode queue for execution. In other words, instead of re-fetching and re-decoding a recently-provided instruction or retrieving and providing micro-ops stored in a micro-op cache to the fetch stage, a reference corresponding to the micro-ops currently stored in the post-decode queue is provided. The reference is used to provide the previously decoded micro-ops corresponding to the instruction address for execution. Providing references in this manner can reduce power consumption of the processor by reducing the number of fetches and decodes. Additionally, because references consume less storage area than corresponding micro-ops, power consumption can also be reduced by allowing the fetch and decode stages to store and pass reference instead of employing dedicated storage to store and pass larger micro-ops.

In this regard in one aspect, a low resource micro-operation controller is provided. The low resource micro-operation controller comprises a short history controller. The short history controller is configured to receive an instruction address for a next instruction to be fetched for execution into an instruction pipeline in an instruction processing system. The short history controller is further configured to determine if the received instruction address corresponds to a stored instruction address in a short history table. The short history controller is further configured to responsive to determining that the received instruction address corresponds to a stored instruction address in the short history table, provide a pointer corresponding to the stored instruction address in the short history table to an instruction fetch circuit. The pointer corresponds to an entry in a post-decode queue in which micro-operations corresponding to the stored instruction address are stored. The low resource micro-operation controller further comprises a tag controller. The tag controller is configured to monitor the post-decode queue. The tag controller is further configured to responsive to the post-decode queue receiving the pointer, provide the micro-operations corresponding to the stored instruction address from the entry in the post-decode queue for execution.

In another aspect, a low resource micro-operation controller is provided. The low resource micro-operation controller comprises a means for receiving an instruction address for a next instruction to be fetched for execution into an instruction pipeline in an instruction processing system. The low resource micro-operation controller further comprises a means for determining if the received instruction address corresponds to a stored instruction address in a short history table. The low resource micro-operation controller further comprises a means for responsive to determining that the received instruction address corresponds to a stored instruction address in the short history table, providing a pointer corresponding to the stored instruction address in the short history table to an instruction fetch circuit. The pointer corresponds to an entry in a post-decode queue in which micro-operations corresponding to the stored instruction address are stored. The low resource micro-operation controller further comprises a means for monitoring the post-decode queue. The low resource micro-operation controller further comprises a means for responsive to the post-decode queue receiving the pointer, providing the micro-operations corresponding to the stored instruction address from the entry in the post-decode queue for execution.

In another aspect, a method for providing a pointer to previously decoded instructions of recently-provided instructions to be executed by a processor is provided. The method comprises receiving an instruction address for a next instruction to be fetched for execution into an instruction pipeline in an instruction processing system. The method further comprises determining if the received instruction address corresponds to a stored instruction address in a short history table. The method further comprises responsive to determining that the received instruction address corresponds to a stored instruction address in the short history table, providing a pointer corresponding to the stored instruction address in the short history table to an instruction fetch circuit. The pointer corresponds to an entry in a post-decode queue in which micro-operations corresponding to the stored instruction address are stored. The method further comprises monitoring the post-decode queue. The method further comprises responsive to the post-decode queue receiving the pointer, providing the micro-operations corresponding to the stored instruction address from the entry in the post-decode queue for execution.

In another aspect, an instruction processing system for a processor is provided. The instruction processing system for a processor comprises one or more instruction pipelines each comprising an instruction fetch circuit configured to fetch instructions into a fetch queue, an instruction decode circuit configured to decode instructions fetched by the instruction fetch circuit, and an execution circuit configured to execute micro-operations of the decoded instructions in a post-decode queue. The instruction processing system further comprises a low resource micro-operation controller. The low resource micro-operation controller comprises a short history controller. The short history controller is configured to receive an instruction address for a next instruction to be fetched for execution into one of the one or more instruction pipelines. The short history controller is further configured to determine if the received instruction address corresponds to a stored instruction address in a short history table. The short history controller is further configured to responsive to determining that the received instruction address corresponds to a stored instruction address in the short history table, provide a pointer corresponding to the stored instruction address in the short history table to the instruction fetch circuit. The pointer corresponds to an entry in the post-decode queue in which the micro-operations corresponding to the stored instruction address are stored. The low resource micro-operation controller further comprises a tag controller. The tag controller is configured to monitor the post-decode queue. The tag controller is further configured to responsive to the post-decode queue receiving the pointer, provide the micro-operations corresponding to the stored instruction address from the entry in the post-decode queue for execution.

BRIEF DESCRIPTION OF THE FIGURES

FIG. 3 is a diagram of an exemplary short history table configured to store an instruction address corresponding to the received instruction addresses and to be accessed by a short history controller employed by the low resource micro-operation controller in FIG. 1;

FIG. 4A is a diagram of an exemplary pointer that can be provided by the low resource micro-operation controller in FIG. 1, wherein the pointer is configured to store an instruction address;

FIG. 4B is a diagram of an exemplary tag table configured to store instruction addresses and corresponding tags used in conjunction with the low resource micro-operation controller in FIG. 1;

FIG. 5A is a diagram of an exemplary pointer that can be provided by the low resource micro-operation controller in FIG. 1, wherein the pointer is configured to store an offset value;

FIG. 5B is a diagram of an exemplary tag table configured to store offset values and corresponding tags used in conjunction with the low resource micro-operation controller in FIG. 1;

DETAILED DESCRIPTION

Figure 1:
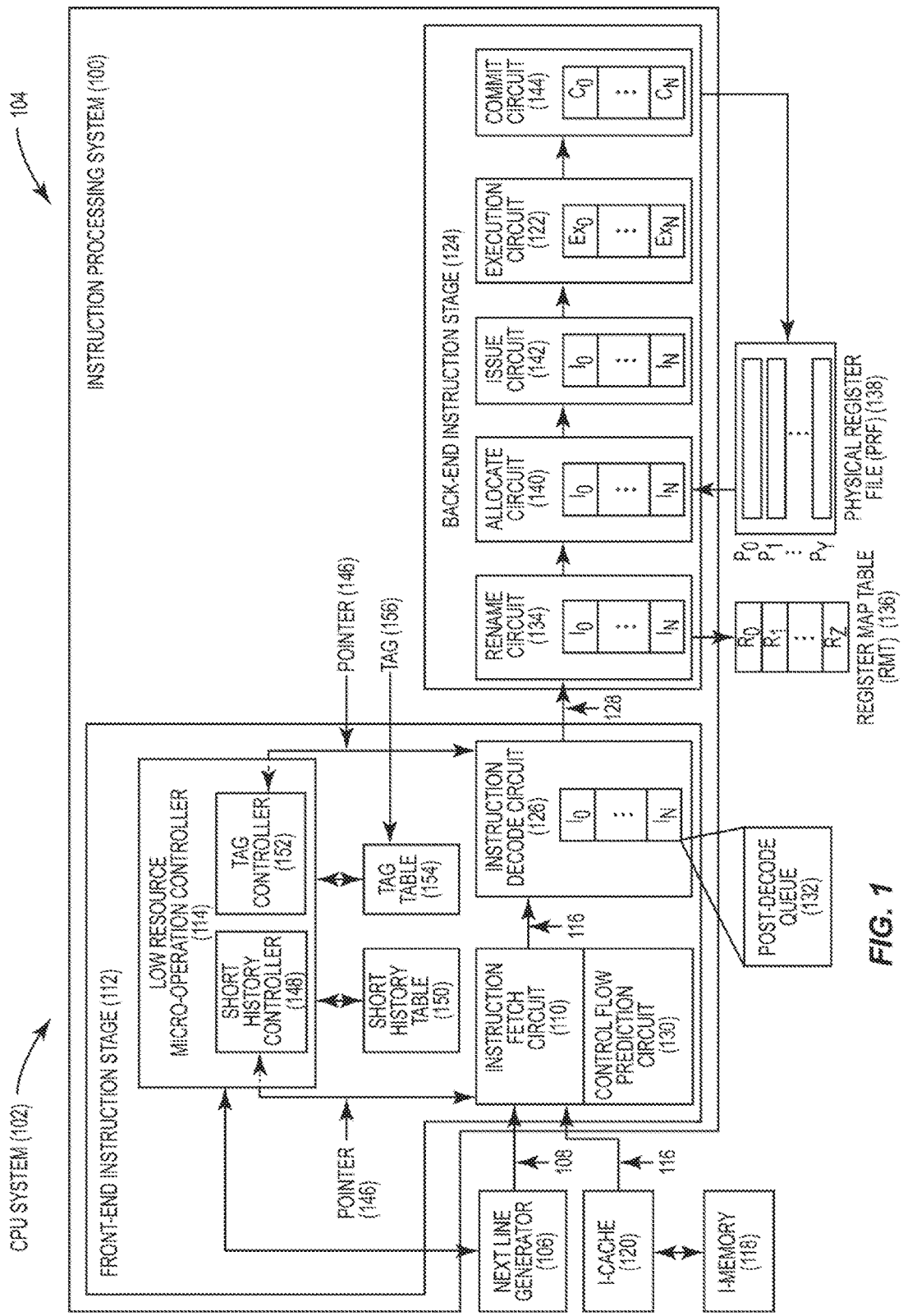
FIG. 1 is a block diagram of an exemplary instruction processing system in a central processing unit (CPU) system, wherein the instruction processing system includes a low resource micro-operation controller configured to provide a reference (e.g., a pointer) corresponding to previously decoded instructions of recently-provided instructions to an instruction fetch circuit.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing references to previously decoded instructions of recently-provided instructions to be executed by a processor. The previously decoded instructions, also known as micro-operations or micro-ops, are generated during a decode stage of instruction processing. Such micro-ops are stored in a post-decode queue of the decode stage so that the micro-ops can be provided to subsequent stages for execution according to the timing of an instruction pipeline. In this regard, in certain aspects disclosed herein, a low resource micro-operation controller configured to provide references (e.g., pointers) corresponding to previously decoded instructions of recently-provided instructions is provided in a processor. In response to the instruction pipeline receiving an instruction address, before a corresponding instruction is fetched, the low resource micro-operation controller is configured to determine if the received instruction address corresponds to an instruction address stored in a short history table. The short history table includes a list of instruction addresses of recently-provided instructions that have micro-ops stored in the post-decode queue. If the received instruction address corresponds to an instruction address in the short history table, the low resource micro-operation controller is configured to provide a reference to the fetch stage such that the instruction pipeline does not need to fetch and decode the corresponding instruction. The reference corresponds to an entry in the post-decode queue in which the micro-ops corresponding to the instruction address are stored. In response to the decode stage receiving the reference, the low resource micro-operation controller is configured to provide the micro-ops from the post-decode queue for execution. In other words, instead of re-fetching and re-decoding a recently-provided instruction or retrieving and providing micro-ops stored in a micro-op cache to the fetch stage, a reference corresponding to the micro-ops currently stored in the post-decode queue is provided. The reference is used to provide the previously decoded micro-ops corresponding to the instruction address for execution. Providing references in this manner can reduce power consumption of the processor by reducing the number of fetches and decodes. Additionally, because references consume less storage area than corresponding micro-ops, power consumption can also be reduced by allowing the fetch and decode stages to store and pass references instead of employing dedicated storage to store and pass larger micro-ops.

In this regard, FIG. 1 is a block diagram of an exemplary instruction processing system 100 provided in a central processing unit (CPU) system 102. The CPU system 102 may be provided in a system-on-a-chip (SoC) 104, as an example. The instruction processing system 100 is configured to process instructions to be executed by a CPU or other processor or processing unit. In this regard, a next line generator 106 provides instruction addresses 108 to an instruction fetch circuit 110 provided in a front-end instruction stage 112 of the instruction processing system 100. The next line generator 106 also provides the instruction addresses 108 to a low resource micro-operation controller 114 of the instruction processing system 100. As discussed in more detail below, unless instructed otherwise by the low resource micro-operation controller 114, the instruction fetch circuit 110 fetches instructions 116 corresponding to the instruction addresses 108 from an instruction memory 118. The instruction processing system 100 is capable of processing instructions 116 using out-of-order processing (OoP), if possible, to achieve greater throughput performance and parallelism. However, other aspects may include in-order processing (IoP). The instruction memory 118 may be provided in or as part of a system memory in the CPU system 102, as an example. An instruction cache 120 may also be provided in the CPU system 102, as shown in FIG. 1, to cache the instructions 116 from the instruction memory 118 to reduce latency in the instruction fetch circuit 110 fetching the instructions 116.

In this example, the instruction fetch circuit 110 is configured to provide the fetched instructions 116 into one or more instruction pipelines $I_0$-$I_N$ in the instruction processing system 100 to be pre-processed before the fetched instructions 116 reach an execution circuit 122 in a back-end instruction stage 124 in the instruction processing system 100 for execution. As will next be discussed, the instruction pipelines $I_0$-$I_N$ are provided across different processing circuits or stages of the instruction processing system 100 to pre-process and process the instructions 116 in a series of steps performed concurrently to increase throughput prior to execution of the instructions 116 in the execution circuit 122.

With continuing reference to FIG. 1, the front-end instruction stage 112 of the instruction processing system 100 in this example includes an instruction decode circuit 126. The instruction decode circuit 126 is configured to decode the fetched instructions 116 fetched by instruction fetch circuit 110 into micro-operations 128 (also referred to herein as micro-ops 128). Decoding the instructions 116 is used to determine the type of instructions and actions required, which in turn is used to determine in which instruction pipeline $I_0$-$I_N$ the micro-ops 128 of the instruction 116 should be placed. A control flow prediction circuit 130 is also provided in the front-end instruction stage 112 to speculate or predict a target address for a control flow instruction 116, such as a conditional branch instruction. The prediction of the target address by the control flow prediction circuit 130 is used by the instruction fetch circuit 110 to determine the next instructions 116 to fetch behind the control flow instruction 116, assuming the control flow instruction 116 will be resolved to jump to the predicted target address.

With continuing reference to FIG. 1, in this example, the micro-ops 128 are placed in one or more of the instruction pipelines $I_0$-$I_N$ corresponding to the instructions 116. Each of the instruction pipelines $I_0$-$I_N$ includes a corresponding post-decode queue 132 in which the corresponding micro-ops 128 are stored. The micro-ops 128 are next provided to a rename circuit 134 in the back-end instruction stage 124 of the instruction processing system 100. The rename circuit 134 is configured to determine if any register names in the micro-ops 128 need to be renamed to break any register dependencies that would prevent parallel or out-of-order processing (OoP) of the instructions 116. Further, the number of architectural registers provided in the CPU system 102 may be limited. In this regard, the rename circuit 134 provided in the back-end instruction stage 124 is configured to call upon a register map table (RMT) 136 to rename the logical source and destination register names to available physical register names in a physical register file (PRF) 138 that typically provides more registers than architectural registers available. An allocate circuit 140 in a next step of the back-end instruction stage 124 reads the physical registers containing source operands from the PRF 138 to determine if the instruction 116 responsible for producing the value has been executed. If the producing instruction 116 has not yet been executed, the value will be received by the producing instruction 116 via a live forwarding path. An issue circuit 142 (also known as a "dispatch circuit") can dispatch the micro-ops 128 out of order to execution units $E_{X0}$-$E_{XN}$ in the execution circuit 122 after identifying and arbitrating among the instructions 116 that have all their source operations ready. A commit circuit 144 is also provided in the back-end instruction stage 124 as a final stage configured to update the architectural and memory state of the CPU system 102 for executed instructions 116 and to process exceptions caused by the executed instructions 116.

With continuing reference to FIG. 1, power is consumed each time the instruction fetch circuit 110 fetches the instructions 116 from the instruction memory 118 or the instruction cache 120. Similarly, additional power is consumed each time the instruction decode circuit 126 decodes the fetched instructions 116 into the micro-ops 128. In other words, multiple cycles of fetching and decoding instructions 116 contributes to the power consumption of the instruction processing system 100. Thus, reducing the frequency in which the instruction fetch circuit 110 and the instruction decode circuit 126 are accessed may reduce the power consumption of the instruction processing system 100.

To reduce the frequency in which the instruction fetch circuit 110 and the instruction decode circuit 126 are accessed, other instruction processing systems similar to the instruction processing system 100 employ dedicated storage in which to store previously decoded micro-ops 128. For example, such instruction processing systems are configured to store micro-ops 128 corresponding to frequently-called instruction addresses 108 in a micro-op cache. In response to an instruction call, if the corresponding micro-ops 128 are stored in the micro-op cache, then the micro-ops 128 are retrieved from the micro-op cache and passed to a particular section of the instruction processing system 100, such as to the instruction decode circuit 126 or to the back-end instruction stage 124. While employing a micro-op cache as described above reduces power consumption through reduced fetching and decoding, retrieving and passing the micro-ops 128 in this manner consumes corresponding power.

In this regard, to reduce fetching and decoding while also avoiding retrieving and passing the micro-ops 128 as discussed above, the low resource micro-operation controller 114 is configured to provide a reference (e.g., a pointer 146) corresponding to the micro-ops 128 of recently-provided instructions 116. The pointer 146 includes information that references a location in which such micro-ops 128 are stored. In this example, the low resource micro-operation controller 114 includes a short history controller 148. The short history controller 148 is configured to determine if the received instruction address 108 corresponds to an instruction address 108 stored in a short history table 150. The short history table 150 includes a list of instruction addresses 108 of recently-provided instructions 116 that have been previously decoded by the instruction decode circuit 126. In this manner, the micro-ops 128 corresponding to such instructions 116 are stored in the post-decode queue 132. If the received instruction address 108 corresponds to an instruction address 108 stored in the short history table 150, the short history controller 148 is configured to prevent the instruction fetch circuit 110 from fetching the instruction 116 corresponding to the received instruction address 108.

In addition to preventing a fetch sequence, the short history controller 148 is configured provide the pointer 146 to the instruction fetch circuit 110. As described in more detail below, the pointer 146 corresponds to an entry in the post-decode queue 132 in which the micro-ops 128 corresponding to the received instruction address 108 are stored. In response to receiving the pointer 146, the instruction fetch circuit 110 provides the pointer 146 to the instruction decode circuit 126.

Further, the low resource micro-operation controller 114 also includes a tag controller 152 configured to monitor the post-decode queue 132. In response to the post-decode queue 132 receiving the pointer 146, the tag controller 152 is configured to provide the micro-ops 128 corresponding to the instruction address 108 from the post-decode queue 132 for execution. For example, the tag controller 152 can be configured to provide the micro-ops 128 by determining if the pointer 146 corresponds to an entry in a tag table 154. Each entry of the tag table 154 stores a tag 156 and data corresponding to an instruction address 108, such as the instruction address 108 itself. If the tag controller 152 determines that the pointer 146 corresponds to an entry in the tag table 154, then the micro-ops 128 corresponding to the instruction address 108 are currently stored in the post-decode queue 132. As described below, such micro-ops 128 are stored in an entry of the post-decode queue 132 indexed by a corresponding tag 156 in the tag table 154. Thus, if an entry stored in the tag table 154 corresponds to the pointer 146, the tag controller 152 is configured to provide the micro-ops 128 from the entry in the post-decode queue 132 indexed by the corresponding tag 156 to the back-end instruction stage 124 for execution. In this manner, the micro-ops 128 provided by the tag controller 152 correspond to the micro-ops 128 generated during a fetch and decode of a previous instance of the received instruction address 108.

In other words, instead of re-fetching and re-decoding a recently-provided instruction 116 or providing micro-ops 128 stored in a micro-op cache to the back-end instruction stage 124, the short history controller 148 is configured to provide the pointer 146 corresponding to the micro-ops 128 currently stored in the post-decode queue 132 if the received instruction address 108 is stored in the short history table 150. Additionally, if the post-decode queue 132 receives the pointer 146, the tag controller 152 is configured to provide the corresponding micro-ops 128 for execution. For example, if the pointer 146 corresponds to an entry in the tag table 154, then the micro-ops 128 corresponding to the received instruction address 108 to which the pointer 146 relates are stored in the post-decode queue 132. Thus, a hit in the tag table 154 causes the tag controller 152 to provide the previously decoded micro-ops 128 for execution. Therefore, providing pointers 146 using the low resource micro-operation controller 114 reduces the power consumption of the CPU system 102 by reducing the number of fetches and decodes. Additionally, because the pointer 146 consumes less storage area than corresponding micro-ops 128, power consumption is also reduced by allowing the instruction fetch circuit 110 and the instruction decode circuit 126 to store and pass the pointer 146 instead of employing dedicated storage that stores and passes the larger micro-ops 128. It is worth noting that in some aspects, the low resource micro-operation controller 114 re-uses the post-decode queue 132 pre-existing in the instruction decode circuit 126 such that implementing the low resource micro-operation controller 114 as described herein does not entail creating a new post-decode queue 132.

With continuing reference to FIG. 1, the low resource micro-operation controller 114 is provided in the front-end instruction stage 112 of the instruction processing system 100 in this example. The low resource micro-operation controller 114 is configured to perform an exemplary process 200 in FIG. 2A to provide pointers 146 corresponding to previously decoded micro-ops 128 to be executed in the instruction processing system 100 to the instruction fetch circuit 110. The low resource micro-operation controller 114 is further configured to perform an exemplary process 300 in FIG. 2B in parallel with the process 200 to provide the micro-ops 128 corresponding to the pointers 146 provided in the process 200 for execution. The processes 200 and 300 will now be described in conjunction with FIG. 1.

Figure 2A:
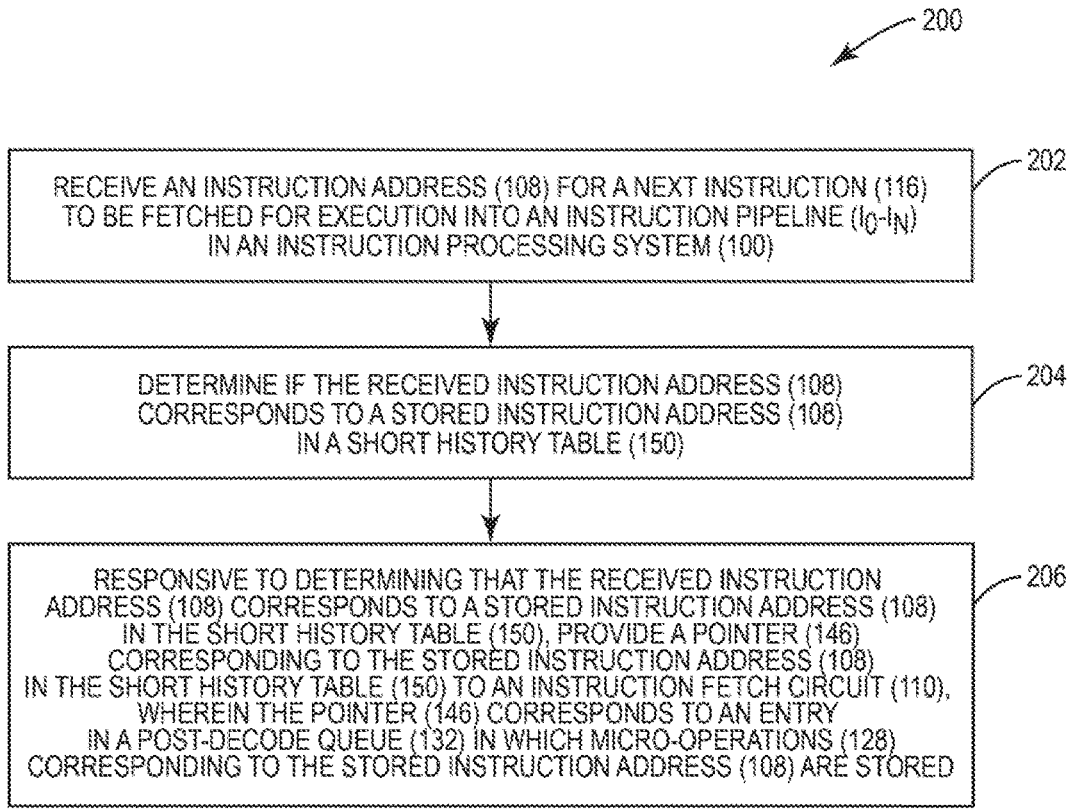
FIG. 2A is a flowchart illustrating an exemplary process employed by the low resource micro-operation controller in FIG. 1 to provide a pointer corresponding to previously decoded instructions of recently-provided instructions to the instruction fetch circuit.
Figure 2B:
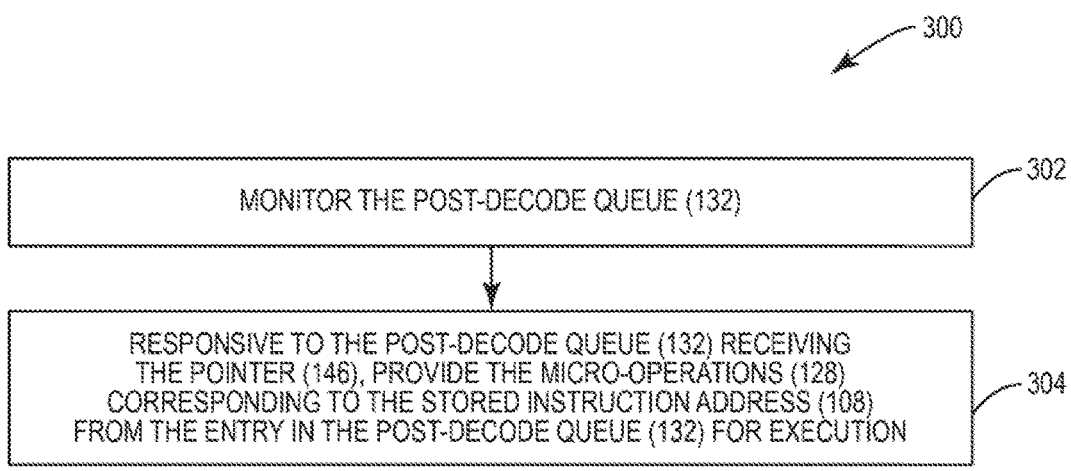
FIG. 2B is a flowchart illustrating an exemplary process employed by the low resource micro-operation controller in FIG. 1 to provide micro-operations corresponding to the pointer provided in the process in FIG. 2A for execution.

In this regard, the short history controller 148 is configured to receive the instruction address 108 for the next instruction 116 to be fetched for execution into one of the instruction pipelines $I_0$-$I_N$ in the instruction processing system 100 (block 202 in FIG. 2A). The short history controller 148 is further configured to determine if the received instruction address 108 corresponds to a stored instruction address 108 in the short history table 150 (block 204 in FIG. 2A). Responsive to determining that the received instruction address 108 corresponds to a stored instruction address 108 in the short history table 150, the short history controller 148 is configured to provide the pointer 146 corresponding to the stored instruction address 108 in the short history table 150 to the instruction fetch circuit 110 (block 206 in FIG. 2A). The pointer 146 corresponds to an entry in the post-decode queue 132 in which micro-ops 128 corresponding to the stored instruction address 108 are stored.

In this regard, the pointer 146 can be used to provide the micro-ops 128 corresponding to the received instruction address 108, which were generated during a previous decode stage. With reference to the process 300 in FIG. 2B, the tag controller 152 is configured to monitor the post-decode queue 132 (block 302 in FIG. 2B). Further, responsive to the post-decode queue 132 receiving the pointer 146, the tag controller 152 is configured to provide the micro-ops 128 corresponding to the stored instruction address 108 from the entry in the post-decode queue 132 for execution. (block 304 in FIG. 2B). Employing the process 200 to provide the pointer 146 in conjunction with the process 300 to provide the micro-ops 128 reduces the power consumption of the CPU system 102 by reducing the number of fetches and decodes. Additionally, because the pointer 146 consumes less storage area than corresponding micro-ops 128, the process 200 also reduces power consumption by allowing the instruction fetch circuit 110 and the instruction decode circuit 126 to store and pass the pointer 146 instead of employing dedicated storage to store and pass the larger micro-ops 128.

To provide greater exemplary detail corresponding to the low resource micro-operation controller 114 in FIG. 1, exemplary elements related to the low resource micro-operation controller 114 will now be described. In this regard, FIG. 3 illustrates an exemplary version of the short history table 150 in FIG. 1 configured to store the instruction address 108 corresponding to the received instruction address 108 in entries $E_0$-$E_N$. For example, an entry $E_0$ stores the instruction address 108 "A." Further, an entry $E_1$ of the short history table 150 stores the instruction address 108 "B." As previously described, the short history controller 148 in FIG. 1 is configured to compare the received instruction address 108 to the instruction addresses 108 stored in the short history table 150 (e.g., "A" and "B") when determining whether to provide the pointer 146.

In this regard, FIG. 4A illustrates an exemplary pointer 146 corresponding to the received instruction address 108 and configured to store the instruction address 108. For example, the pointer 146 in FIG. 4A includes a pointer indicator (PI) used to indicate to various elements in the instruction processing system 100 in FIG. 1 that the pointer 146 is to be treated as a pointer structure as opposed to an instruction 116, for example. The pointer 146 in FIG. 4A also includes the instruction address 108 (INST ADDR). In this manner, elements in the instruction processing system 100 relate the pointer 146 to the received instruction address 108 via the actual instruction address 108 stored in the pointer 146. In this regard, FIG. 4B illustrates an exemplary version of the tag table 154 in FIG. 1 configured to store the instruction address 108 (INSTR ADDR) and corresponding tags 156 (TAG) in entries $E_{T0}$-$E_{TM}$, such that the tag table 154 can be employed in conjunction with the pointer 146 in FIG. 4A. For example, an entry $E_{T0}$ in the tag table 154 in FIG. 4B stores the tag 156 (TAG) "0" and the instruction address 108 "A." Further, an entry $E_{T1}$ in the tag table 154 in FIG. 4B stores the tag 156 (TAG) "1" and the instruction address 108 "B." In this manner, the tag controller 152 in FIG. 1 can use the instruction address 108 "A" in the pointer 146 to determine from the tag table 154 that the micro-ops 128 corresponding to the instruction address 108 "A" are stored at an entry in the post-decode queue 132 corresponding to the tag 156 (TAG) "0."

In contrast, FIG. 5A illustrates an exemplary pointer 146' corresponding to the received instruction address 108 and configured to store an offset value (OFFSET) as described above. For example, the pointer 146' in FIG. 5A includes the pointer indicator (PI) similar to the pointer 146 in FIG. 4A. However, the pointer 146' in FIG. 5A includes the offset value (OFFSET) instead of the instruction address 108. In this manner, elements in the instruction processing system 100 relate the pointer 146' to the received instruction address 108 via the offset value (OFFSET). The offset value (OFFSET) potentially consumes less space than the instruction address 108. Thus, employing the offset value (OFFSET) can provide further power reduction. In this regard, FIG. 5B illustrates an exemplary version of the tag table 154' in FIG. 1 configured to store the offset value (OFFSET) corresponding tags 156 (TAG), such that the tag table 154' can be employed in conjunction with the pointer 146' in FIG. 5A. For example, an entry $E_{T0}$ in the tag table 154' in FIG. 5B stores the tag 156 (TAG) "0" and the offset value (OFFSET) "−2." Further, an entry $E_{T1}$ in the tag table 154' in FIG. 5B stores the tag 156 (TAG) "1" and the offset value (OFFSET) "−1." In this manner, the tag controller 152 in FIG. 1 can use the offset value (OFFSET) "−2" in the pointer 146' to determine from the tag table 154' that the micro-ops 128 corresponding the received instruction address 108 "A" are stored at an entry in the post-decode queue 132 corresponding to the tag 156 (TAG) "0."

Figure 6A:
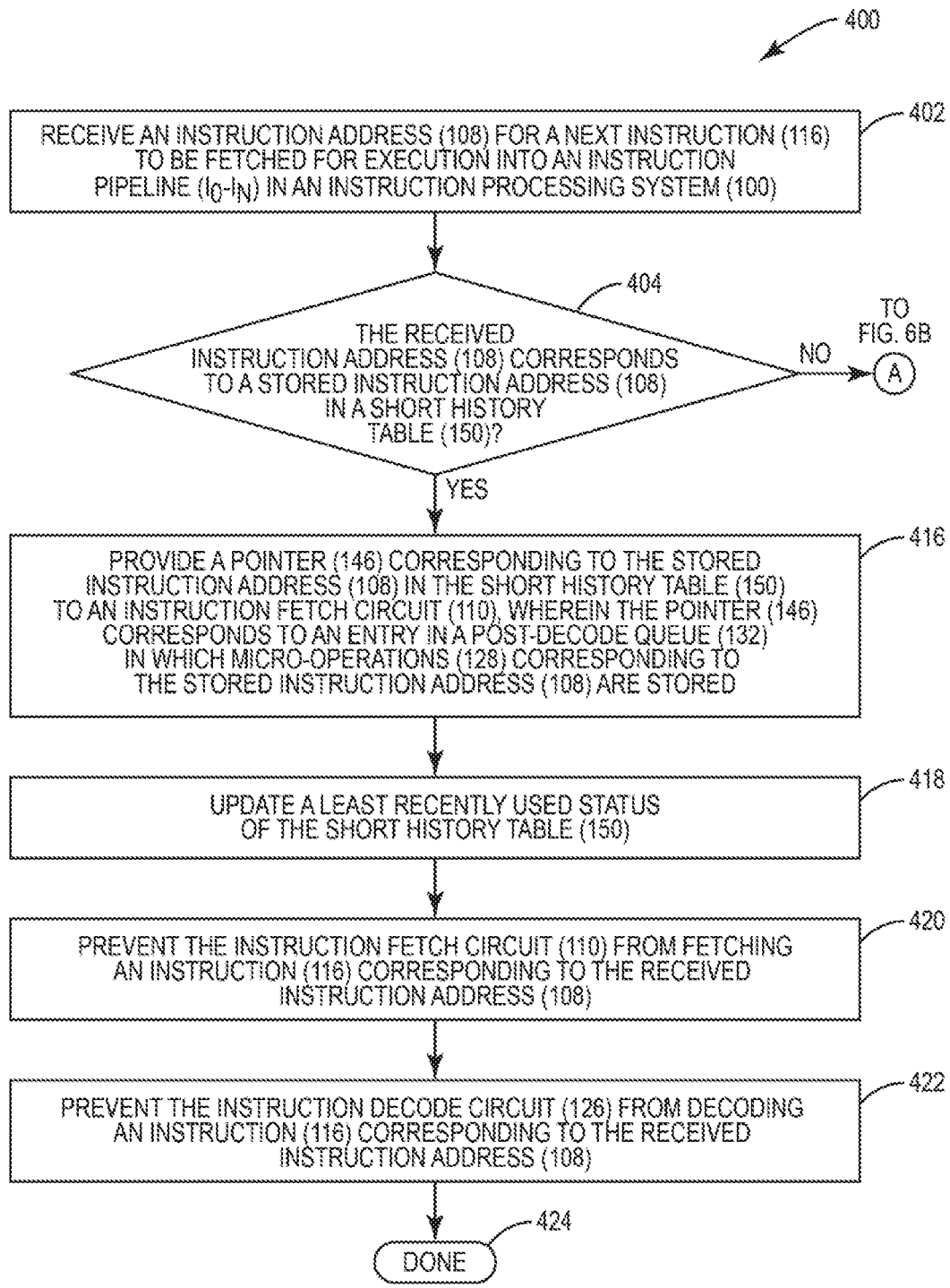
FIGS. 6A and 6B are a flowchart illustrating another exemplary process employed by the low resource micro-operation controller in FIG. 1 to provide a pointer corresponding to previously decoded instructions of recently-provided instructions to the instruction fetch circuit.
Figure 6B:
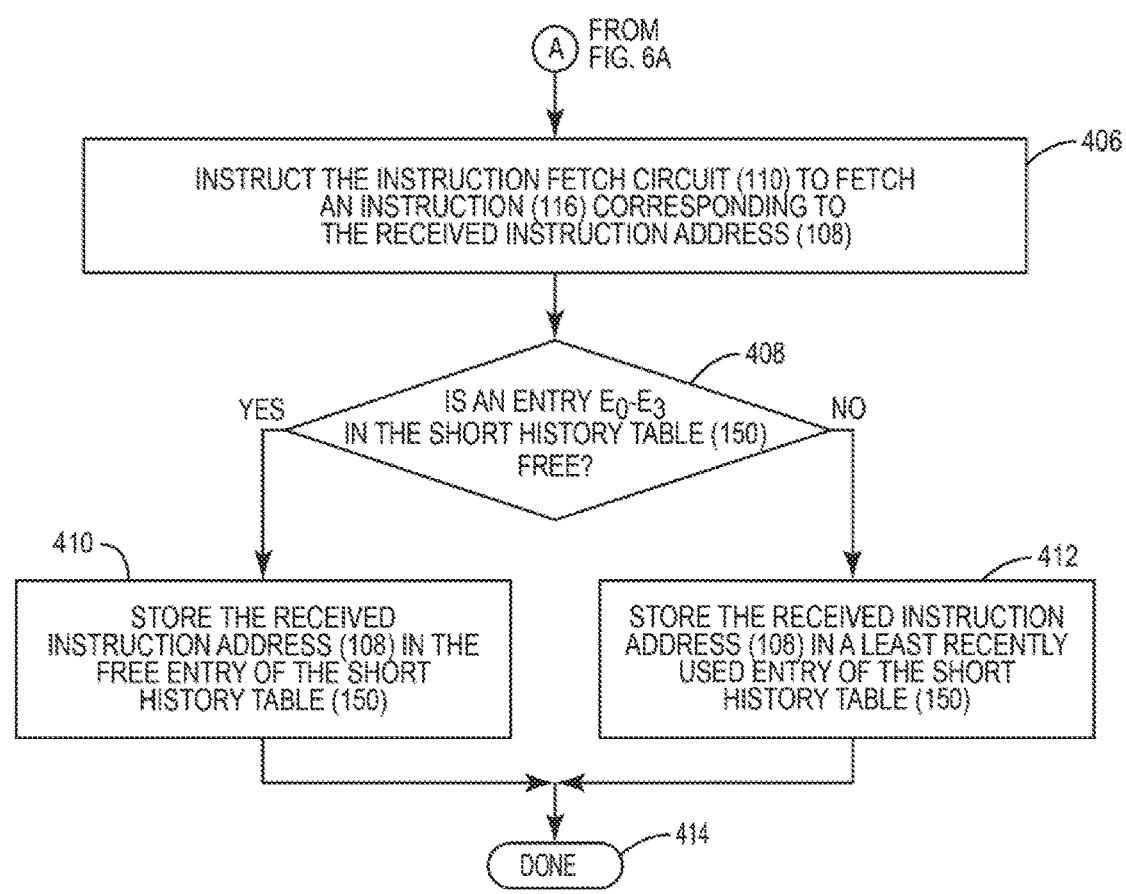
Figure 7A:
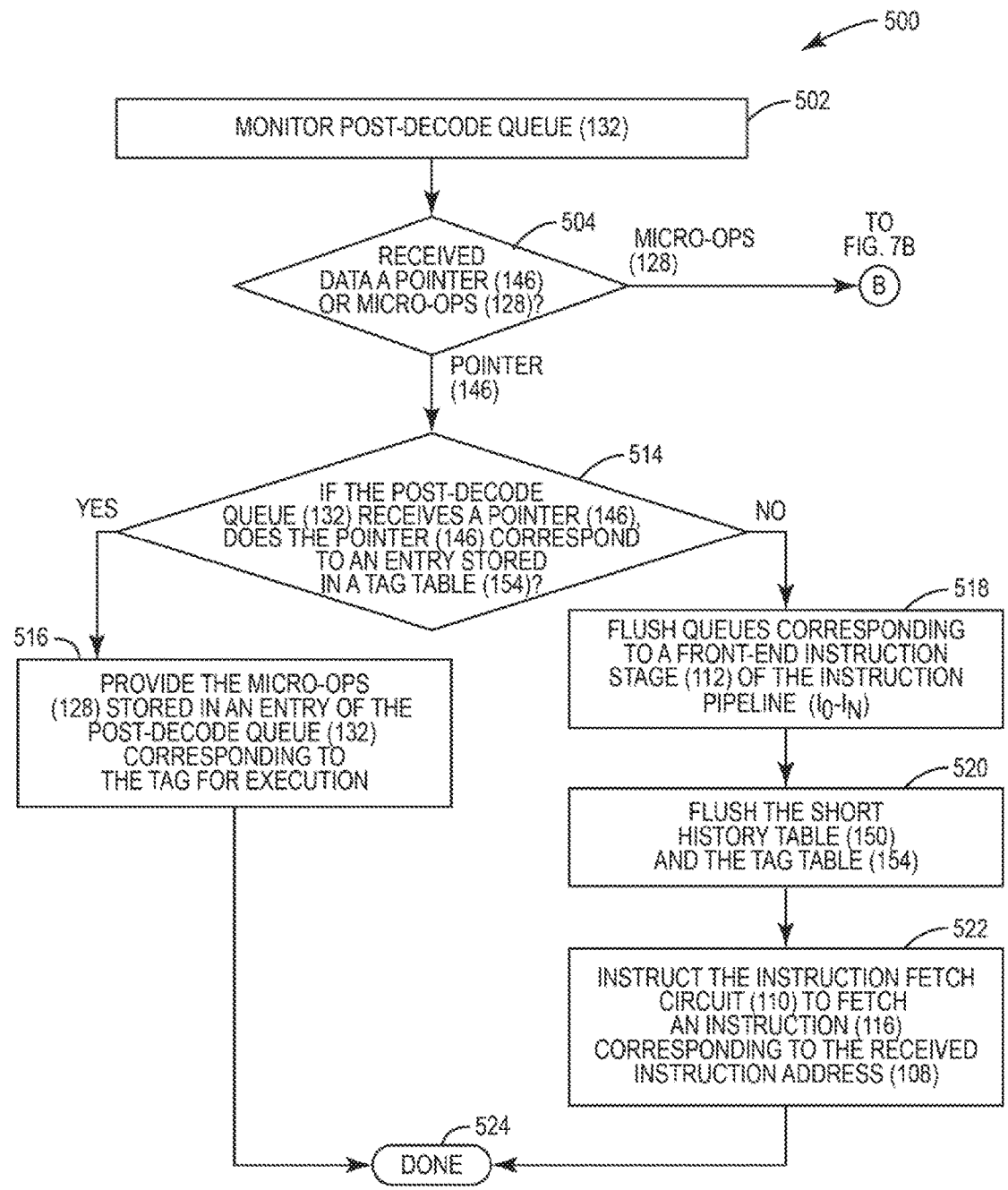
FIGS. 7A and 7B are a flowchart illustrating an exemplary process employed by the low resource micro-operation controller in FIG. 1 to provide micro-operations corresponding to the pointer provided in the process in FIGS. 6A and 6B for execution.
Figure 7B:
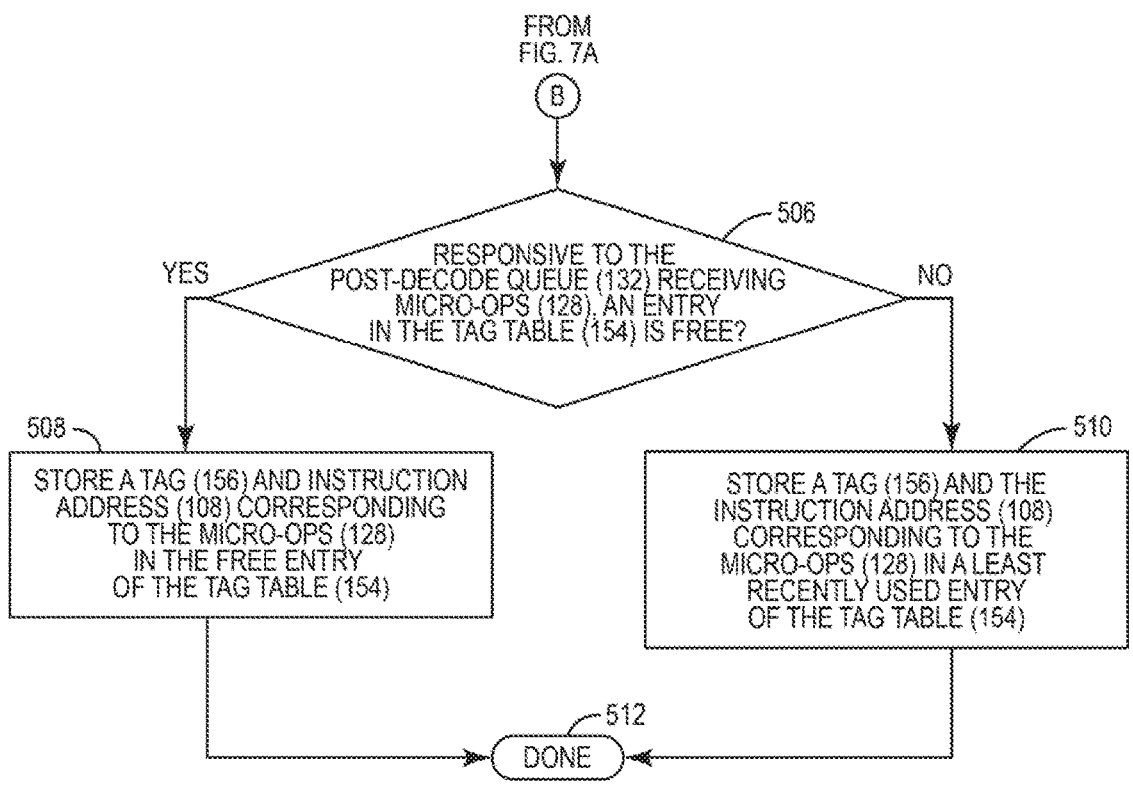

In addition to the example provided above in relation to the process 200 in FIG. 2, the low resource micro-operation controller 114 in FIG. 1 can be configured to take additional information into account and take further steps related to providing pointers 146 corresponding to the micro-ops 128 of recently-provided instructions 116. The additional information and steps processed by the low resource micro-operation controller 114 can provide a more detailed analysis such that the pointers 146 and corresponding micro-ops 128 are provided more efficiently. In this manner, FIGS. 6A and 6B illustrate an exemplary process 400 that can be employed by the low resource micro-operation controller 114 to provide pointers 146 corresponding to previously decoded micro-ops 128 of recently-provided instructions 116 to the instruction fetch circuit 110. Further, FIGS. 7A and 7B illustrate a process 500 that can be employed by the low resource micro-operation controller 114 in parallel with the process 400 to provide the micro-ops 128 corresponding to the pointers 146 provided in the process 400 for execution. The process 400 in FIGS. 6A and 6B and the process 500 in FIGS. 7A and 7B will be described in conjunction with diagrams in FIGS. 8A-8K illustrating contents of the short history table 150, the tag table 154, and the post-decode queue 132 during various steps of the process 400. FIGS. 8A-8K also include a stage table 600 illustrating elements associated with the instruction fetch circuit 110 and the instruction decode circuit 126 during the processes 400, 500. For example, the stage table 600 illustrates the contents of a first fetch stage (F1), a second fetch stage (F2), and a first decode stage (D1) in the instruction fetch circuit 110. Further, the stage table 600 illustrates the contents of a second decode stage (D2) which corresponds to the post-decode queue 132. The stage table 600 also illustrates the contents of a first back-end stage (BE1). The short history table 150 and the tag table 154 in FIGS. 8A-8K are similar to the short history table 150 and the tag table 154 provided in FIGS. 3 and 4B, respectively. Although the short history table 150 and the tag table 154 have the same number of entries $E_0$-$E_3$ and $E_{T0}$-$E_{T3}$, respectively, other aspects can employ the short history table 150 having a different numbers of entries as compared to the tag table 154.

Figure 8A:
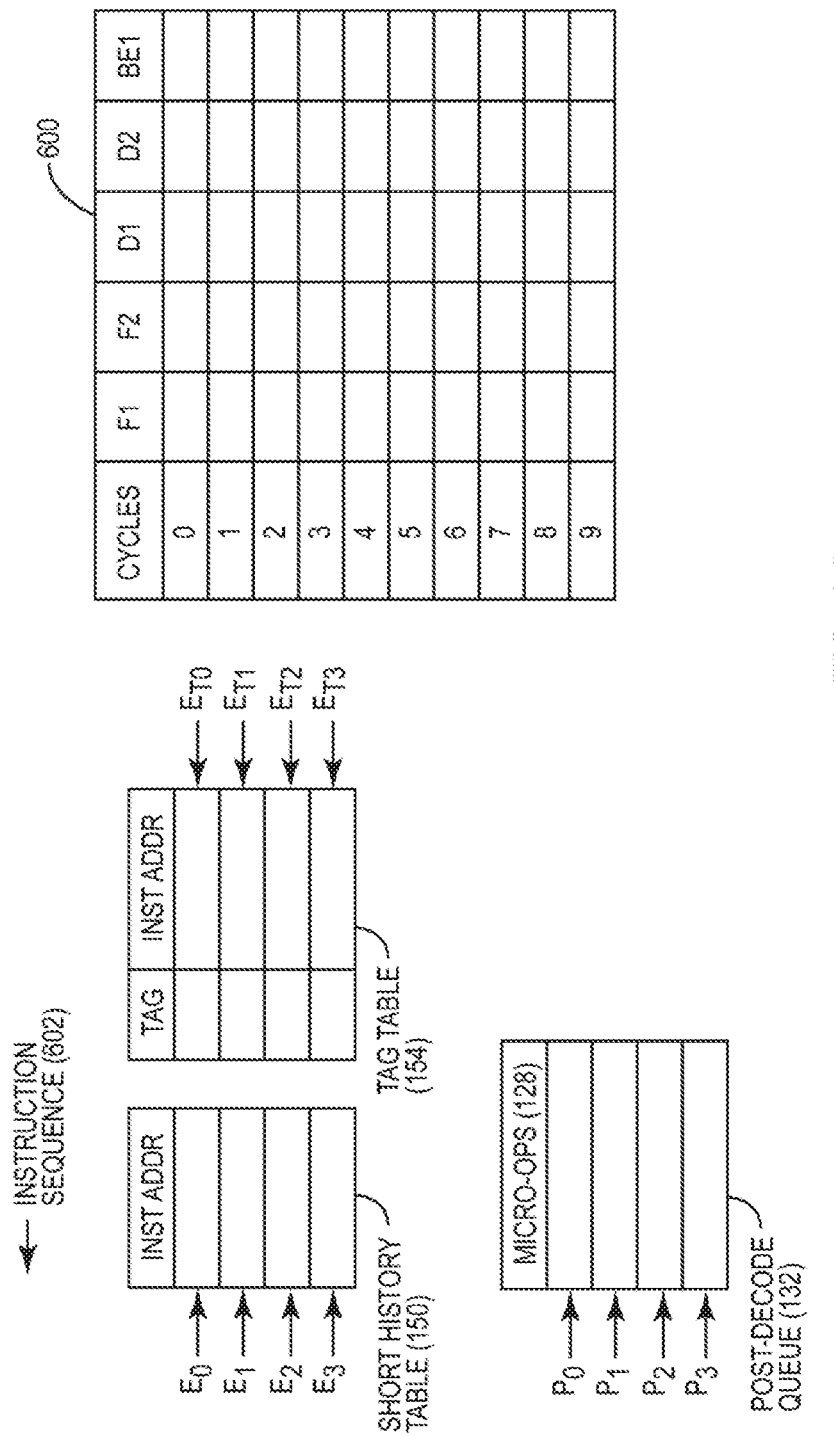
FIGS. 8A-8K are diagrams illustrating various states of the short history table and the tag table controlled by the low resource micro-operation controller in FIG. 1 during exemplary operation.

In this regard, FIG. 8A illustrates that the short history table 150, tag table 154, and stages corresponding to the stage table 600 are empty prior to initiation of the process 400. For example, FIG. 8A may represent the contents of the short history table 150, tag table 154, and stages (F1, F2, D1, D2, BE1) following start-up of the instruction processing system 100. As illustrated in an instruction sequence 602 in FIG. 8B, the low resource micro-operation controller 114 receives the instruction address 108 "A" for the next instruction 116 to be fetched for execution (block 402 in FIG. 6A). In response to receiving the instruction address 108 "A," the short history controller 148 determines if the received instruction address 108 "A" corresponds to a stored instruction address 108 in the short history table 150 (block 404 in FIG. 6A). If the received instruction address 108 "A" is not stored in the short history table 150, the short history controller 148 instructs the instruction fetch circuit 110 to fetch the instruction 116 "I-A" corresponding to the received instruction address 108 "A" (block 406 in FIG. 6B). With reference to cycle 0 in FIG. 8B, in response to performing the fetch in block 406, the instruction 116 "I-A" is provided to the first fetch stage F1.

Figure 8B:
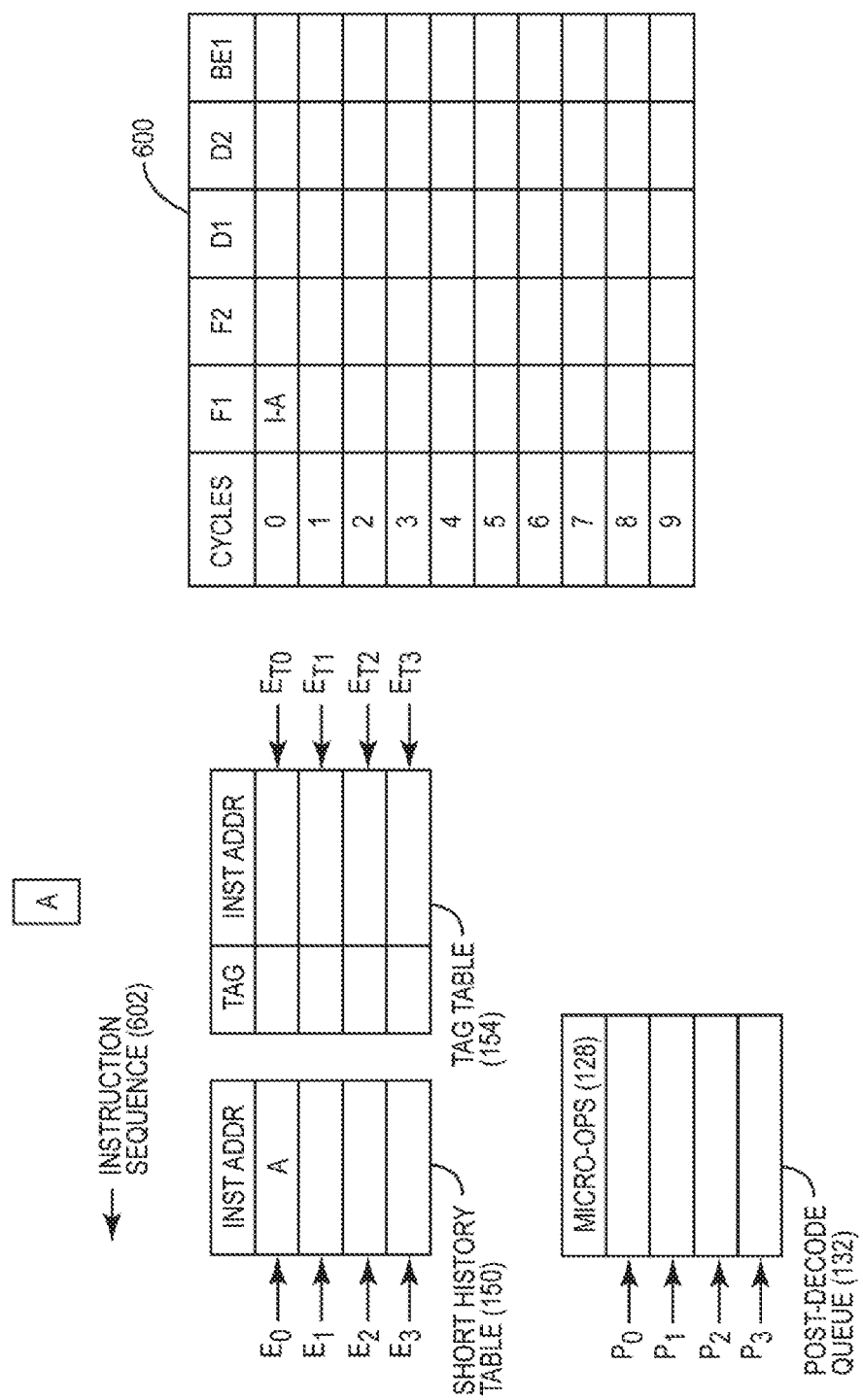

In addition to instructing the instruction fetch circuit 110 to perform the fetch in block 406, the short history controller 148 updates the short history table 150 in response to the miss generated in block 404. To update the short history table 150, the short history controller 148 determines if the any entry $E_0$-$E_3$ in the short history table 150 is free (block 408 in FIG. 6B). As illustrated in FIG. 8A, each entry $E_0$-$E_3$ in the short history table 150 is free (e.g., empty), because no entry $E_0$-$E_3$ has a stored instruction address 108. Thus, as illustrated in FIG. 8B, the short history controller 148 stores the received instruction address 108 "A" in the free entry $E_0$ of the short history table 150 (block 410 in FIG. 6B). In this example, the short history table 150 is configured to be updated based on a first-in, first-out (FIFO) scheme. Thus, if the short history controller 148 determines that no entry $E_0$-$E_3$ in the short history table 150 is free in block 408, then the short history controller 148 stores the received instruction address 108 "A" in the least recently used entry $E_0$-$E_3$ of the short history table 150 (block 412 in FIG. 6B). Following storage of the received instruction address 108 "A" in either block 410 or 412, the process 400 is done with the iteration corresponding to the received instruction address 108 "A" (block 414 in FIG. 6A).

In contrast to generating a miss in the short history table 150 as described above, if the short history controller 148 determines that the received instruction address 108 is stored in the short history table 150 in block 404, the short history controller 148 provides the pointer 146 corresponding to the stored instruction address 108 to the instruction fetch circuit 110 (block 416 in FIG. 6A). In this aspect, if the short history controller 148 provides the pointer 146 as described, the short history controller 148 updates a least recently used status of the short history table 150 (block 418 in FIG. 6A). Updating the least recently used status ensures that the next instruction address 108 stored in the short history table 150 is stored in an entry $E_0$-$E_3$ following the FIFO scheme. Further, the short history controller 148 prevents the instruction fetch circuit 110 from fetching the received instruction address 108 (block 420 in FIG. 6A), and also prevents the instruction decode circuit 126 from decoding the received instruction address 108 (block 422 in FIG. 6A). Preventing the fetch and decode in blocks 420 and 422, respectively, reduces power consumption of the instruction processing system 100 when the pointer 146 is provided to the instruction fetch circuit 110. Following prevention of fetching and decoding in blocks 420 and 422, respectively, the process 400 is done with the iteration (block 424 in FIG. 7A).

In addition to the short history controller 148 processing the received instruction address 108 using the process 400 as described above, the tag controller 152 employs a process 500 to monitor the post-decode queue 132 (block 502 in FIG. 7A). With reference to FIG. 8B, because no data is received at the second decode stage (D2) corresponding to the post-decode queue 132, the process 500 does not proceed past block 502.

Figure 8C:
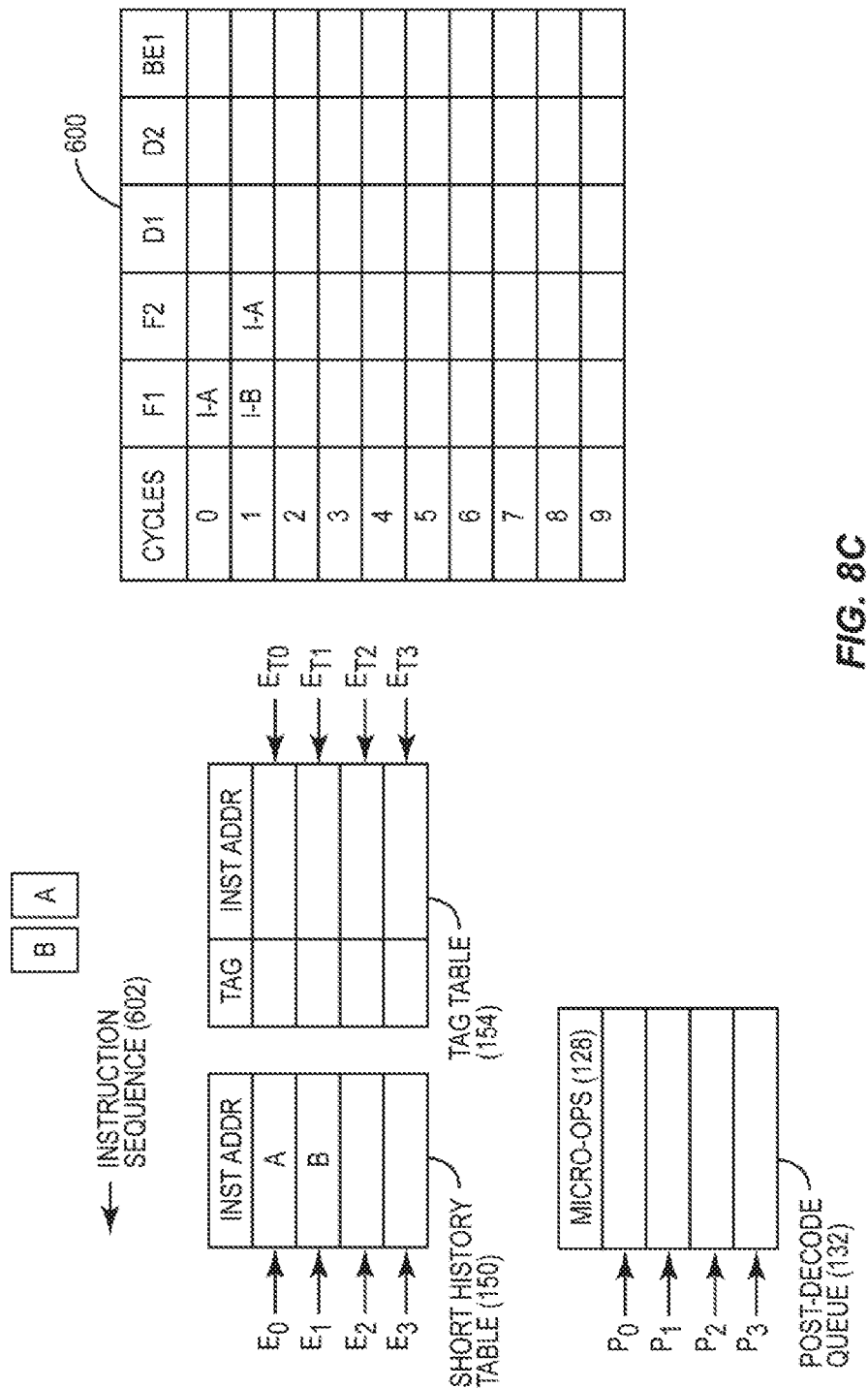

With reference to FIG. 8C, the low resource micro-operation controller 114 receives the instruction address 108 "B" for the next instruction 116 in the instruction sequence 602 in block 402. The short history controller 148 determines that the instruction address 108 "B" is not stored in the short history table 150 at block 404. Thus, the short history controller 148 instructs the instruction fetch circuit 110 to fetch the instruction 116 "I-B" corresponding to the received instruction address 108 "B" in block 406. With reference to cycle 1 in FIG. 8C, in response to performing the fetch in block 406, the instruction 116 "I-B" is provided to the first fetch stage F1, while the instruction 116 "I-A" proceeds to the second fetch stage F2. Additionally, the short history controller 148 updates the short history table 150 in response to the miss generated in block 404. As illustrated in FIG. 8C, the short history controller 148 determines that the entry $E_1$ is free in the short history table 150 in block 408, and thus, stores the received instruction address 108 "B" in the free entry $E_1$ in block 410. Following storage of the received instruction address 108 "B," the process 400 is done with the iteration in block 414. Further, because no data is received at the second decode stage (D2) corresponding to the post-decode queue 132, the process 500 does not proceed past block 502.

Figure 8D:
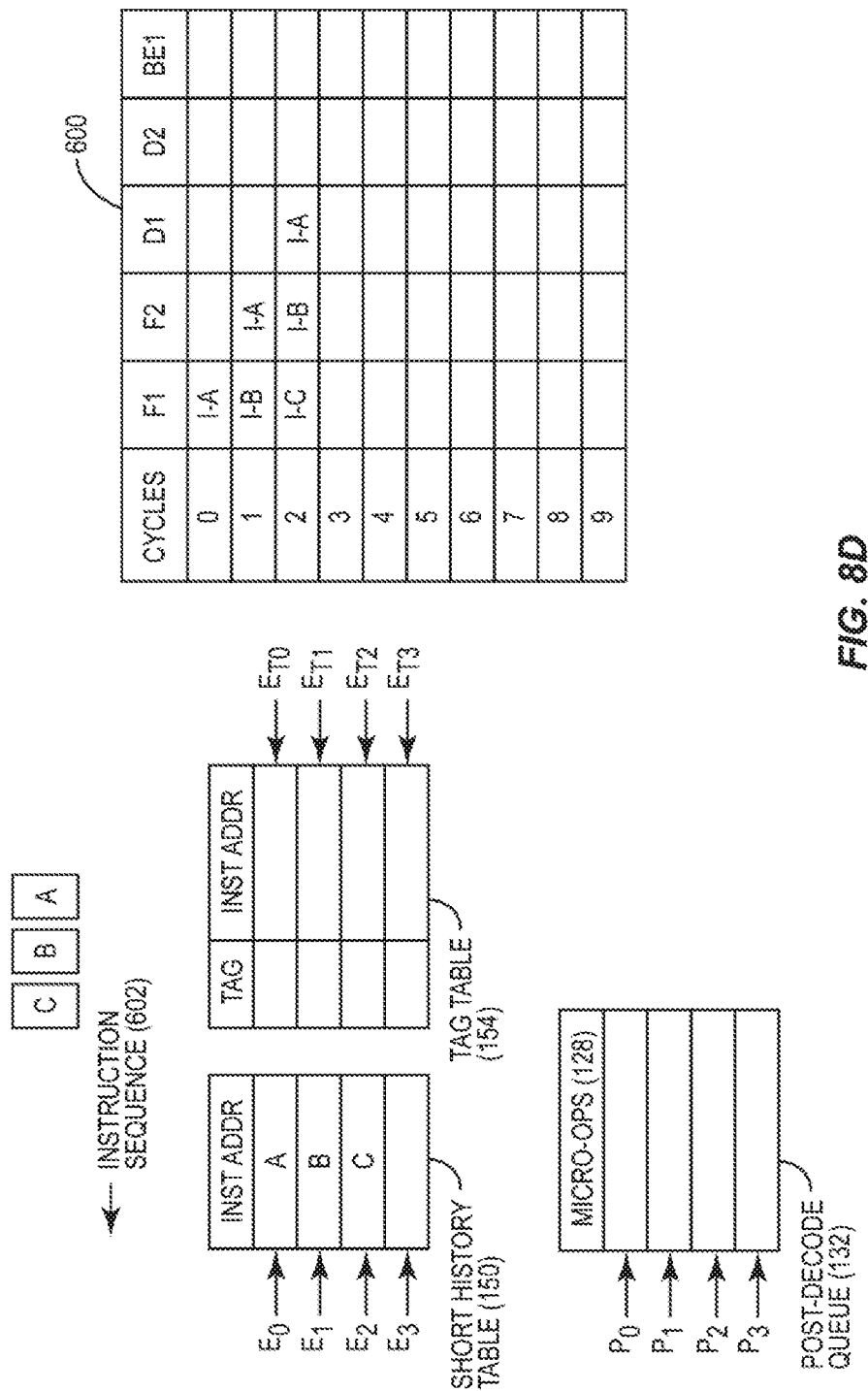

With reference to FIG. 8D, the low resource micro-operation controller 114 receives the instruction address 108 "C" for the next instruction 116 in the instruction sequence 602 in block 402. The short history controller 148 determines that the instruction address 108 "C" is not stored in the short history table 150 at block 404. Thus, the short history controller 148 instructs the instruction fetch circuit 110 to fetch the instruction 116 "I-C" corresponding to the received instruction address 108 "C" in block 406. With reference to cycle 2 in FIG. 8D, in response to performing the fetch in block 406, the instruction 116 "I-C" is provided to the first fetch stage F1, the instruction 116 "I-B" proceeds to the second fetch stage F2, and the instruction 116 "I-A" proceeds to the first decode stage D1. Additionally, the short history controller 148 updates the short history table 150 in response to the miss generated in block 404. As illustrated in FIG. 8D, the short history controller 148 determines that the entry $E_2$ is free in the short history table 150 in block 408, and thus, stores the received instruction address 108 "C" in the free entry $E_2$ in block 410. Following storage of the received instruction address 108 "C," the process 400 is done with the iteration in block 414. Further, because no data is received at the second decode stage (D2) corresponding to the post-decode queue 132, the process 500 does not proceed past block 502.

Figure 8E:
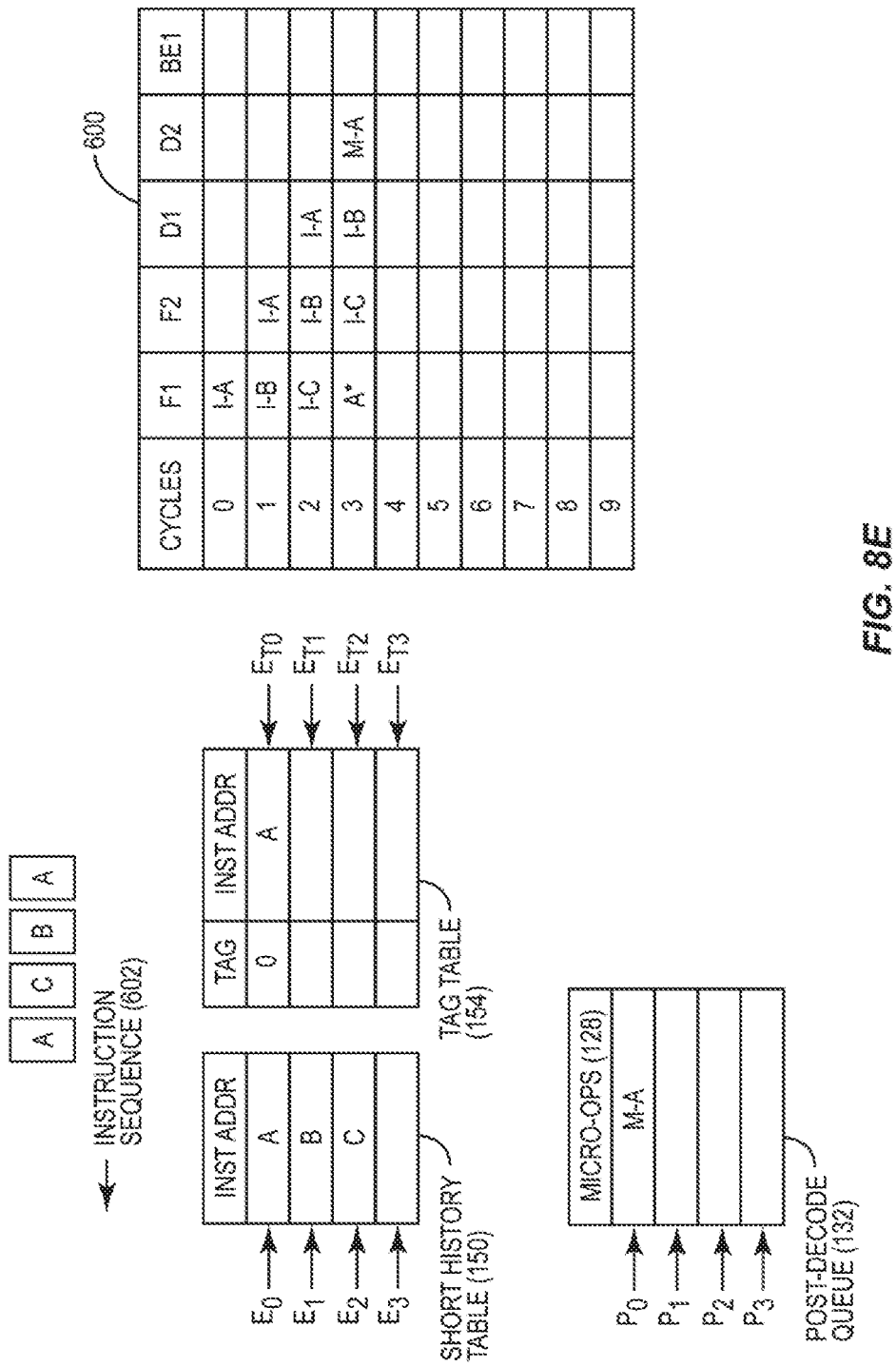

With reference to FIG. 8E, the low resource micro-operation controller 114 receives the instruction address 108 "A" for the next instruction 116 in the instruction sequence 602 in block 402. The short history controller 148 determines that the instruction address 108 "A" is stored in the short history table 150 in block 404. Thus, the short history controller 148 provides the pointer 146 "A*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 3 in FIG. 8E, in response to providing the pointer 146 "A*," the pointer 146 "A*" is provided to the first fetch stage F1, the instruction 116 "I-C" proceeds to the second fetch stage F2, and the instruction 116 "I-B" proceeds to the first decode stage D1. Further, in response to receiving the instruction 116 "I-A" at the first decode stage D1 in the previous cycle (cycle 2), the instruction decode circuit 126 decodes the instruction 116 "I-A" and provides the corresponding micro-ops 128 "M-A" to the second decode stage D2, thus storing the micro-ops 128 "M-A" in entry $P_0$ of the post-decode queue 132.

In response to receiving the micro-ops 128 "M-A" at the post-decode queue 132 in block 502, the tag controller 152 determines if the micro-ops 128 "M-A" are a pointer 146 or micro-ops 128 (block 504 in FIG. 7A). In response to determining that the micro-ops 128 "M-A" correspond to micro-ops 128, the tag controller 152 determines if an entry $E_{T0}$-$E_{T3}$ is free in the tag table 154 (block 506 in FIG. 7B). Each entry $E_{T0}$-$E_{T3}$ in the tag table 154 is free. Thus, the tag controller 152 stores the tag 156 "0" and the instruction address 108 "A" corresponding to the micro-ops 128 "M-A" in the free entry $E_{T0}$ of the tag table 154 (block 508 in FIG. 7B). The tag 156 "0" corresponds to the entry $P_0$ of the post-decode queue 132 in which the micro-ops 128 "M-A" are stored. In this example, the tag table 154 is configured to be updated based using a FIFO scheme. Thus, if the tag controller 152 determines that no entry $E_{T0}$-$E_{T3}$ in the tag table 154 is free in block 506, then the tag controller 152 stores the tag 156 and the instruction address 108 "A" in the least recently used entry $E_{T0}$-$E_{T3}$ of the tag table 154 (block 510 in FIG. 7B). Following storage of the tag 156 and the instruction address 108 "A" in either block 508 or 510, the process 500 is done with the iteration corresponding to the received instruction address 108 "A" (block 512 in FIG. 7B).

Figure 8F:
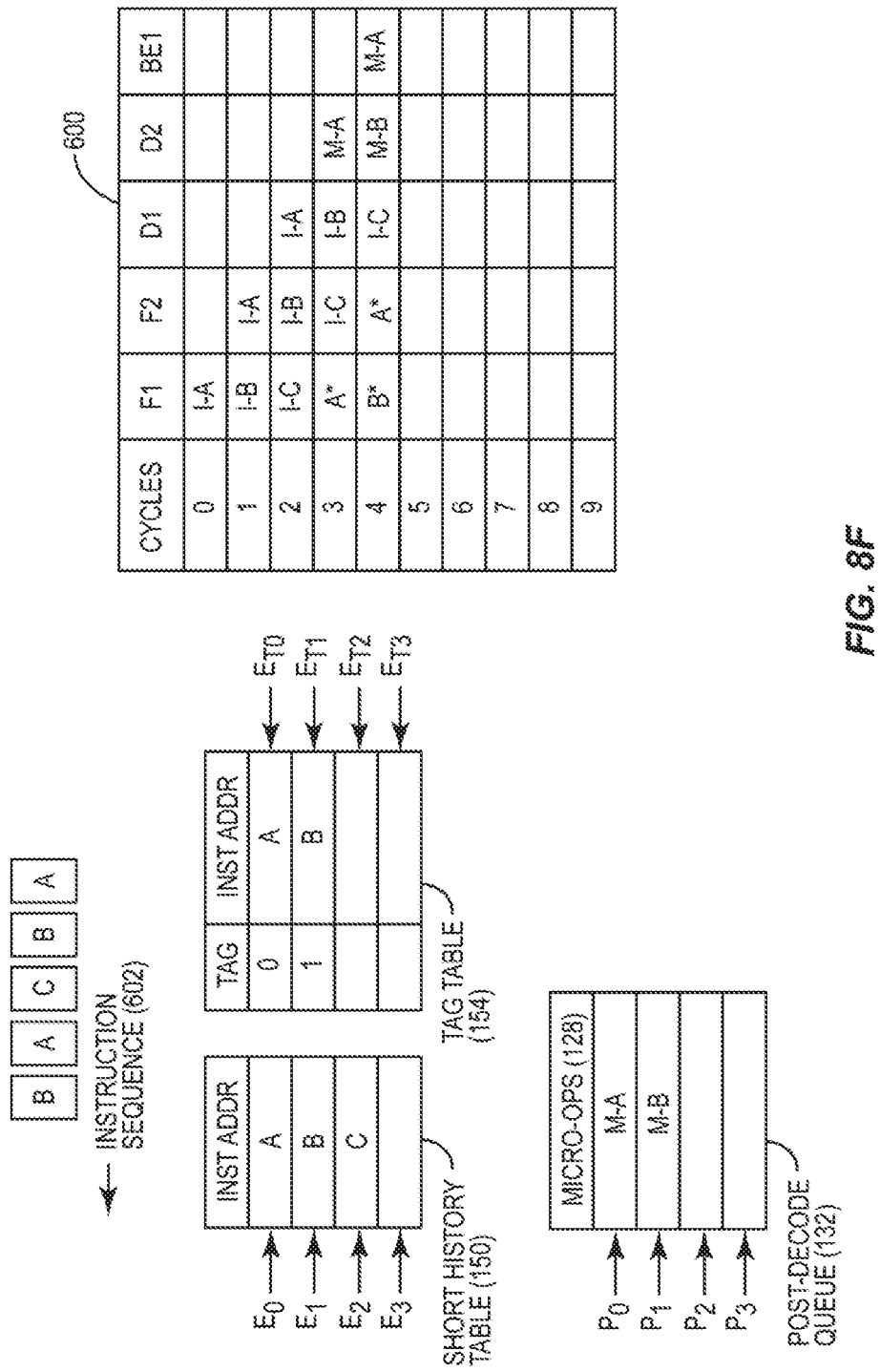

With reference to FIG. 8F, the low resource micro-operation controller 114 receives the instruction address 108 "B" for the next instruction 116 in the instruction sequence 602 in block 402. The short history controller 148 determines that the instruction address 108 "B" is stored in the short history table 150 in block 404. Thus, the short history controller 148 provides the pointer 146 "B*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 4 in FIG. 8F, in response to providing the pointer 146 "B*," the pointer 146 "B*" is provided to the first fetch stage F1, the pointer 146 "A*" proceeds to the second fetch stage F2, and the instruction 116 "I-C" proceeds to the first decode stage D1. Further, in response to receiving the instruction 116 "I-B" at the first decode stage D1 in the previous cycle (cycle 3), the instruction decode circuit 126 decodes the instruction 116 "I-B" and provides the corresponding micro-ops 128 "M-B" to the second decode stage D2, thus storing the micro-ops 128 "M-B" in entry $P_1$ of the post-decode queue 132. The micro-ops 128 "M-A" are provided from the entry $P_0$ of the post-decode queue 132 to the first back-end stage BE1 for execution.

In response to receiving the micro-ops 128 "M-B" at the post-decode queue 132 in block 502, the tag controller 152 determines that the micro-ops 128 "M-B" are micro-ops 128 in block 504. The tag controller 152 then determines that the tag table 154 has a free entry $E_{T1}$ in block 506. Thus, as illustrated in FIG. 8F, the tag controller 152 stores a tag 156 "1" the instruction address 108 "B" corresponding to the micro-ops 128 "M-B" in the free entry $E_{T1}$ of the tag table 154 in block 508. The tag 156 "1" corresponds to the entry $P_1$ of the post-decode queue 132 in which the micro-ops 128 "M-B" are stored. The process 500 is then done with the iteration corresponding to the received instruction address 108 "B" in block 512.

Figure 8G:
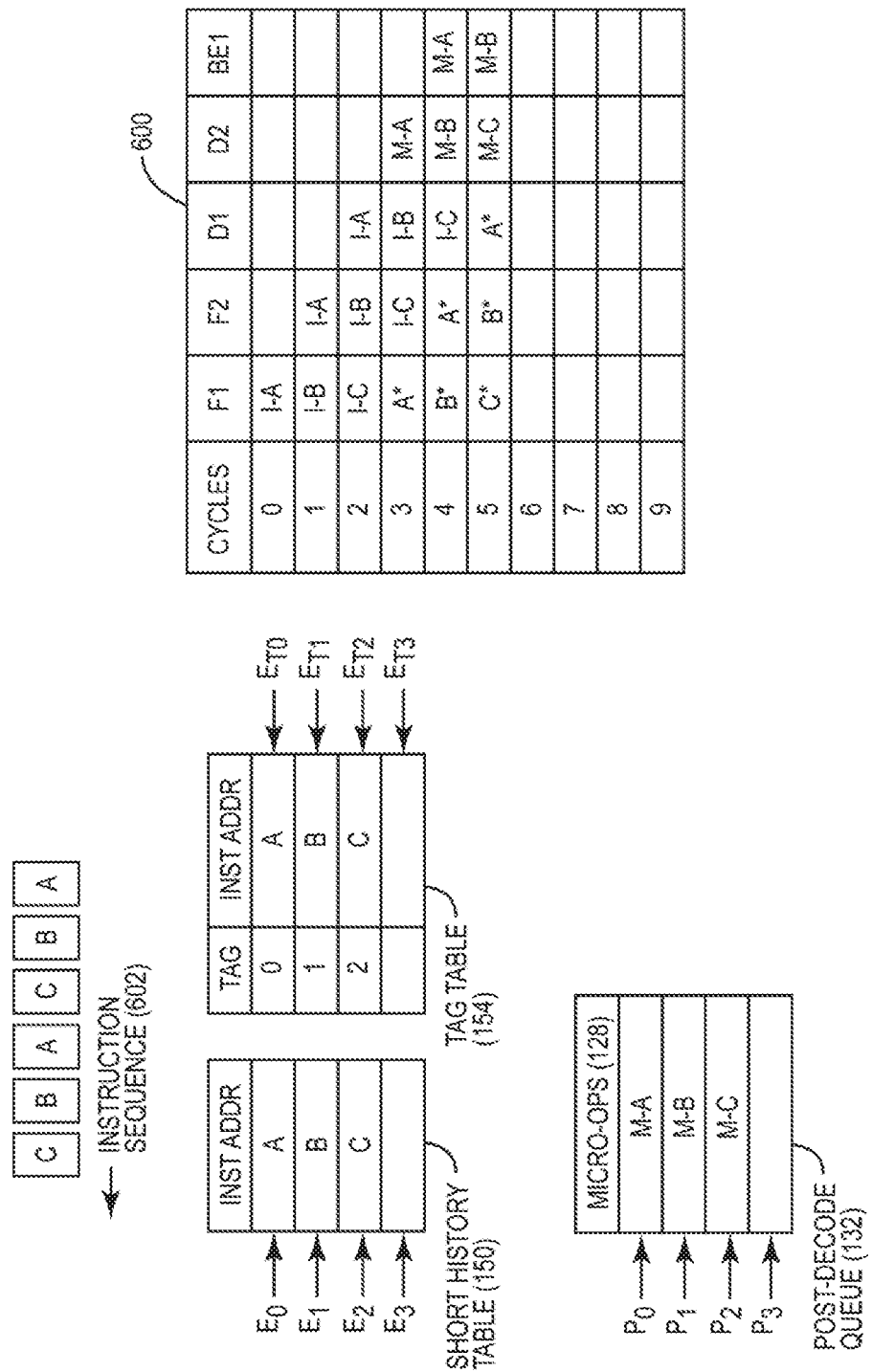

With reference to FIG. 8G, the low resource micro-operation controller 114 receives the instruction address 108 "C" for the next instruction 116 in the instruction sequence 602 in block 402. The short history controller 148 determines that the instruction address 108 "C" is stored in the short history table 150 in block 404. Thus, the short history controller 148 provides the pointer 146 "C*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 5 in FIG. 8G, in response to providing the pointer 146 "C*," the pointer 146 "C*" is provided to the first fetch stage F1, the pointer 146 "B*" proceeds to the second fetch stage F2, and the pointer 146 "A*" proceeds to the first decode stage D1. Further, in response to receiving the instruction 116 "I-C" at the first decode stage D1 in the previous cycle (cycle 4), the instruction decode circuit 126 decodes the instruction 116 "I-C" and provides the corresponding micro-ops 128 "M-C" to the second decode stage D2, thus storing the micro-ops 128 "M-C" in entry $P_2$ of the post-decode queue 132. The micro-ops 128 "M-B" are provided from the entry $P_1$ of the post-decode queue 132 to the first back-end stage BE1 for execution.

In response to receiving the micro-ops 128 "M-C" at the post-decode queue 132 D2 in block 502, the tag controller 152 determines that the micro-ops 128 "M-C" are micro-ops 128 in block 504. The tag controller 152 then determines that the tag table 154 has a free entry $E_{T2}$ in block 506. Thus, as illustrated in FIG. 8G, the tag controller 152 stores a tag 156 "2" and the instruction address 108 "C" corresponding to the micro-ops 128 "M-C" in the free entry $E_{T2}$ of the tag table 154 in block 508. The tag 156 "2" corresponds to the entry $P_2$ of the post-decode queue 132 in which the micro-ops 128 "M-C" are stored. The process 500 is then done with the iteration corresponding to the received instruction address 108 "C" in block 512.

Figure 8H:
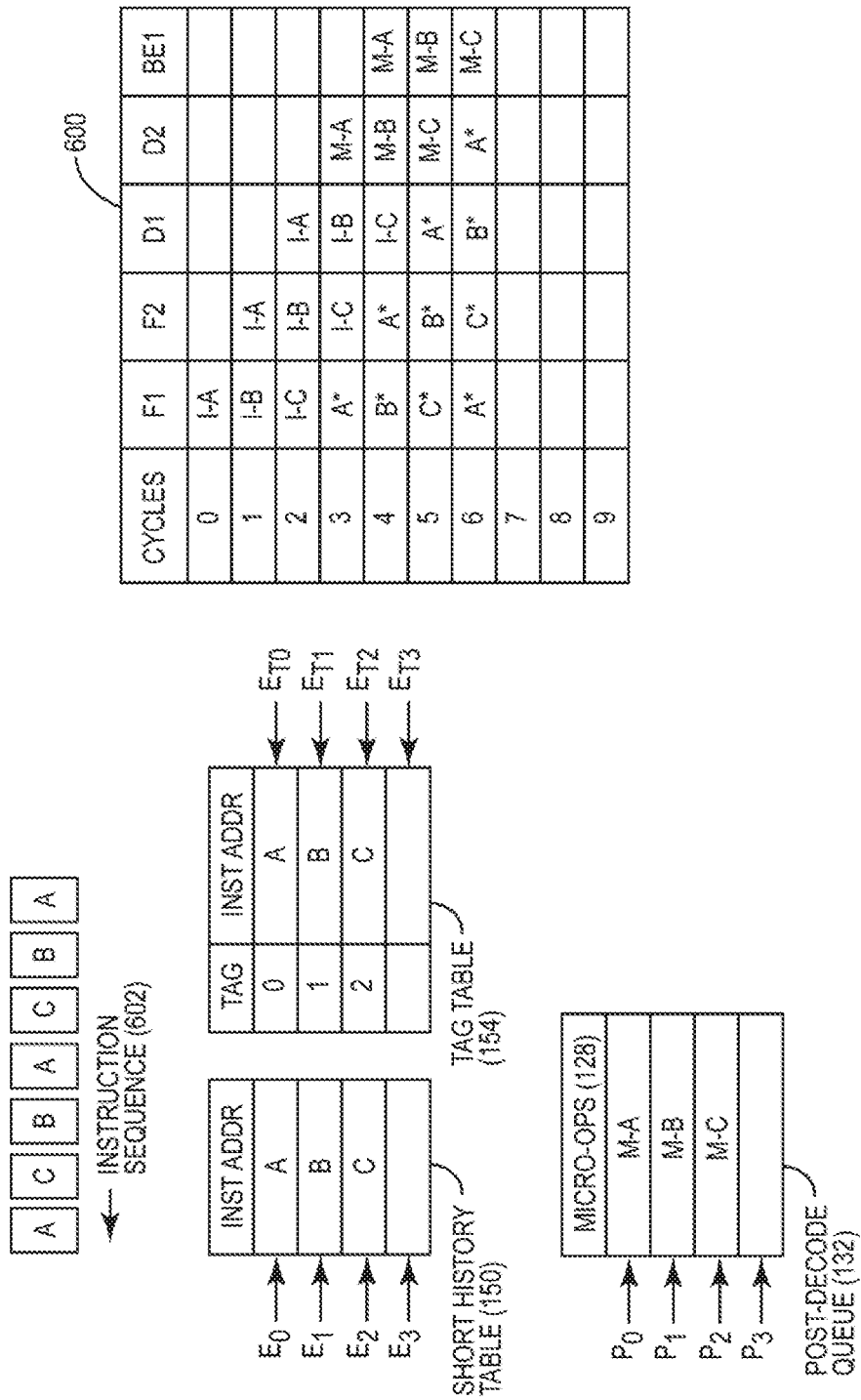

With reference to FIG. 8H, the low resource micro-operation controller 114 receives the instruction address 108 "A" for the next instruction 116 in the instruction sequence 602 in block 402. The short history controller 148 determines that the instruction address 108 "A" is stored in the short history table 150 in block 404. Thus, the short history controller 148 provides the pointer 146 "A*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 6 in FIG. 8H, in response to providing the pointer 146 "A*," the pointer 146 "A*" is provided to the first fetch stage F1, the pointer 146 "C*" proceeds to the second fetch stage F2, the pointer 146 "B*" proceeds to the first decode stage D1, and the pointer 146 "A*" proceeds to the second decode stage D2. Additionally, the micro-ops 128 "M-C" are provided from the entry $P_2$ of the post-decode queue 132 to the first back-end stage BE1 for execution.

Further, in response to receiving the pointer 146 "A*" at the post-decode queue 132 in block 502, the tag controller 152 determines that the pointer 146 "A*" is a pointer 146 in block 504. The tag controller 152 then determines that the pointer 146 "A*" corresponds to an instruction address 108 stored in an entry $E_{T0}$-$E_{T3}$ in the tag table 154 (block 514 in FIG. 7A). If the pointer 146 "A*" corresponds to an entry $E_{T0}$-$E_{T3}$, then the micro-ops 128 "M-A" are still stored in the post-decode queue 132. Thus, in response to determining that pointer 146 "A*" corresponds to the entry $E_{T0}$, the tag controller 152 provides the micro-ops 128 "M-A" from the entry $P_0$ of the post-decode queue 132 to the first back-end stage BE1 for execution (block 516 in FIG. 7A), as illustrated in cycle 7 of FIG. 8I.

Figure 8I:
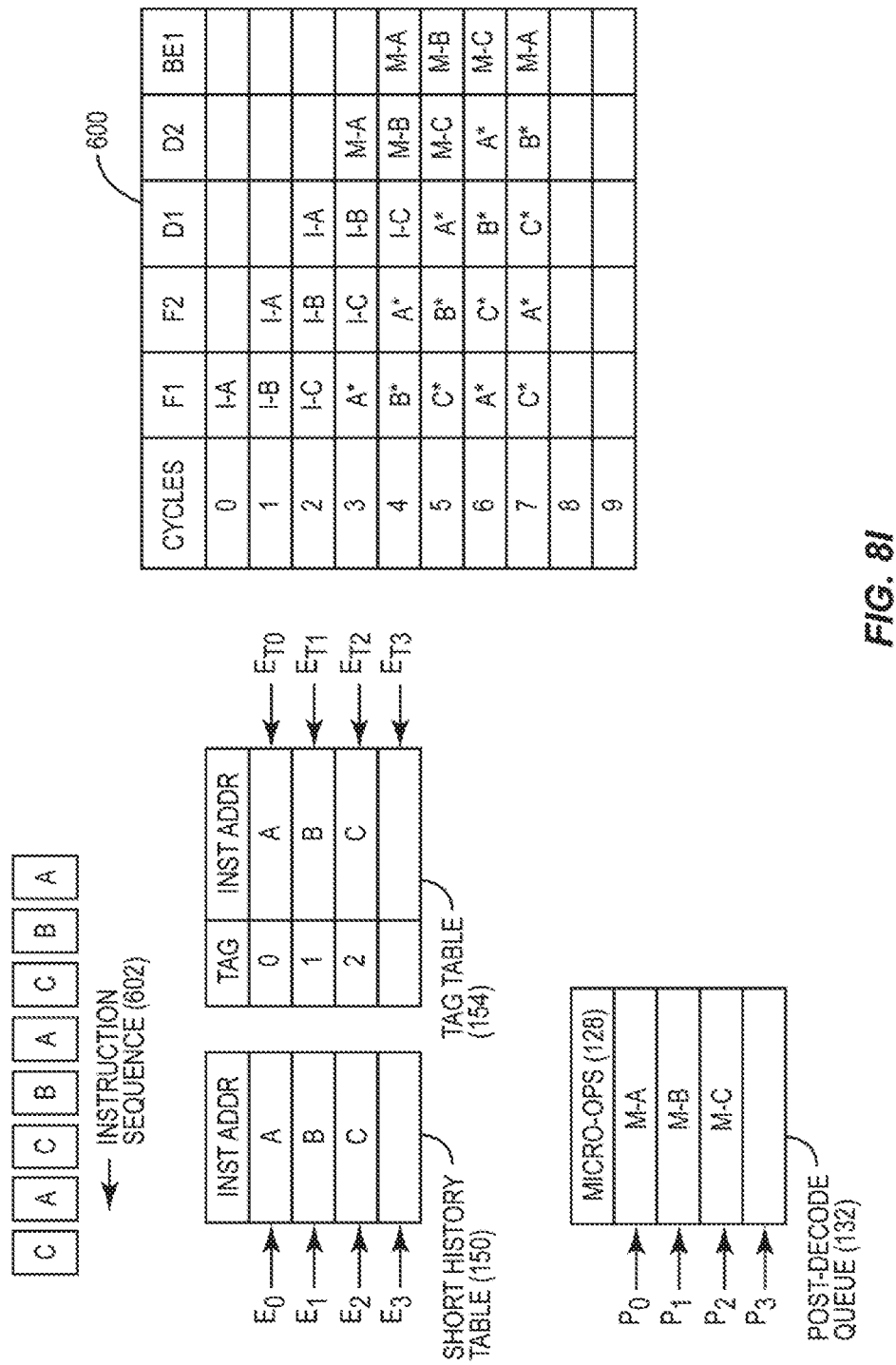

With reference to FIG. 8I, the low resource micro-operation controller 114 receives the instruction address 108 "C" for the next instruction 116 in the instruction sequence 602 in block 402. The short history controller 148 determines that the instruction address 108 "C" is stored in the short history table 150 in block 404. Thus, the short history controller 148 provides the pointer 146 "C*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 7 in FIG. 8I, in response to providing the pointer 146 "C*," the pointer 146 "C*" is provided to the first fetch stage F1, the pointer 146 "A*" proceeds to the second fetch stage F2, the pointer 146 "C*" proceeds to the first decode stage D1, and the pointer 146 "B*" proceeds to the second decode stage D2. Additionally, as previously noted, the micro-ops 128 "M-A" are provided from the entry $P_0$ of the post-decode queue 132 to the first back-end stage BE1 for execution.

Further, in response to receiving the pointer 146 "B*" at the post-decode queue 132 in block 502, the tag controller 152 determines that the pointer 146 "B*" is a pointer 146 in block 504. The tag controller 152 then determines that the pointer 146 "B*" corresponds to an instruction address 108 stored in entry $E_1$ in the tag table 154 in block 514. Thus, the micro-ops 128 "M-B" are still stored in the post-decode queue 132. In response to determining that pointer 146 "B*" corresponds to the entry $E_{T1}$, the tag controller 152 provides the micro-ops 128 "M-B" from the entry $P_1$ of the post-decode queue 132 to the first back-end stage BE1 for execution in block 516, as illustrated in cycle 8 of FIG. 8J.

Figure 8J:
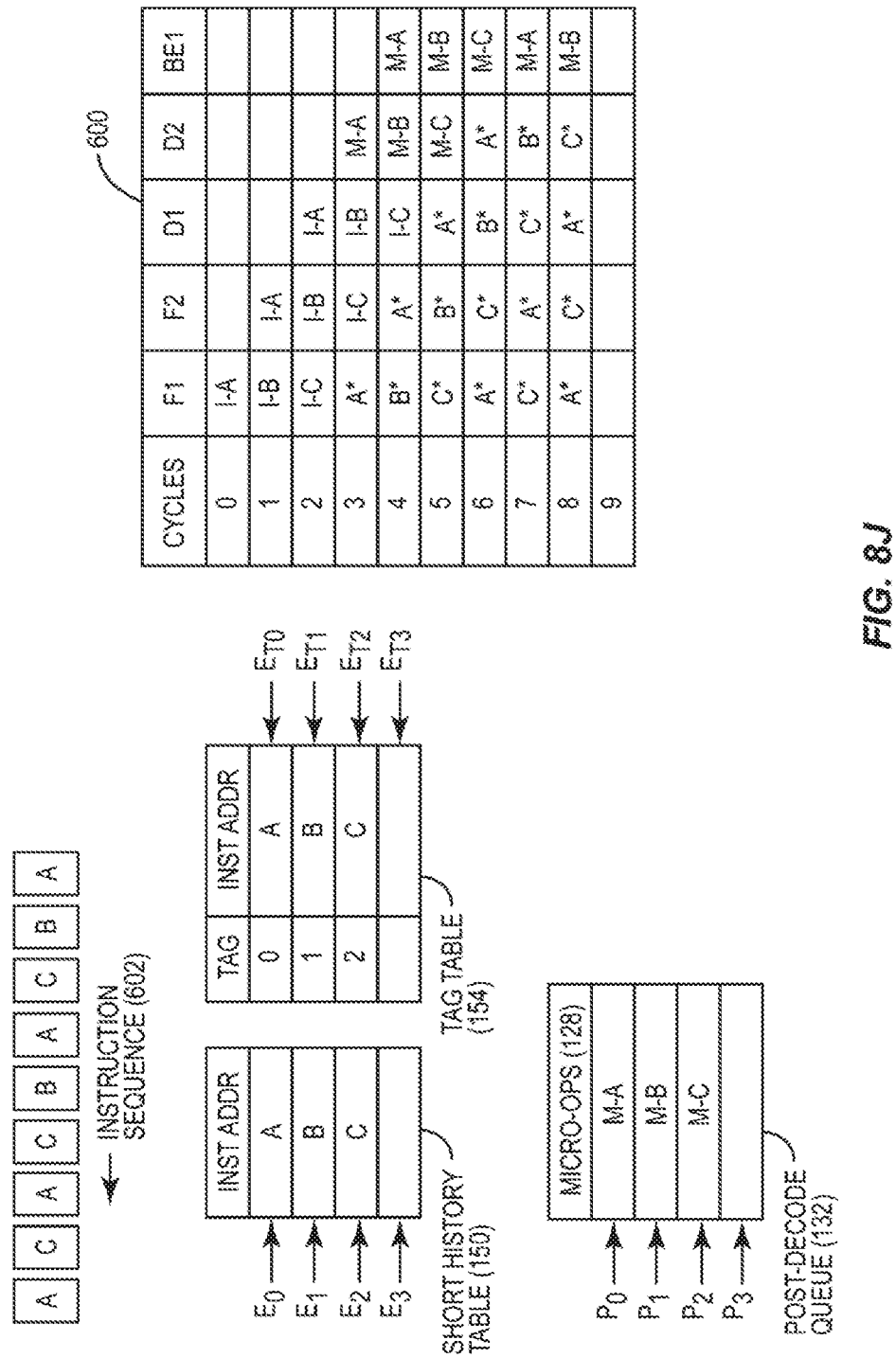

With reference to FIG. 8J, the low resource micro-operation controller 114 receives the instruction address 108 "A" for the next instruction 116 in the instruction sequence 602 in block 402. The short history controller 148 determines that the instruction address 108 "A" is stored in the short history table 150 in block 404. Thus, the short history controller 148 provides the pointer 146 "A*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 8 in FIG. 8J, in response to providing the pointer 146 "A*," the pointer 146 "A*" is provided to the first fetch stage F1, the pointer 146 "C*" proceeds to the second fetch stage F2, the pointer 146 "A*" proceeds to the first decode queue D1, and the pointer 147 "C*" proceeds to the second decode stage D2. Additionally, as previously noted, the micro-ops 128 "M-B" are provided from the entry $P_1$ of the post-decode queue 132 to the first back-end stage BE1 for execution.

Further, in response to receiving the pointer 146 "C*" at the post-decode queue 132 in block 502, the tag controller 152 determines that the pointer 146 "C*" is a pointer 146 in block 504. The tag controller 152 then determines that the pointer 146 "C*" corresponds to an instruction address 108 stored in entry $E_2$ in the tag table 154 in block 514. Thus, the micro-ops 128 "M-C" are still stored in the post-decode queue 132. In response to determining that pointer 146 "C*" corresponds to the entry $E_{T2}$, the tag controller 152 provides the micro-ops 128 "M-C" from the entry $P_2$ of the post-decode queue 132 to the first back-end stage BE1 for execution in block 516, as illustrated in cycle 9 of FIG. 8K.

Figure 8K:
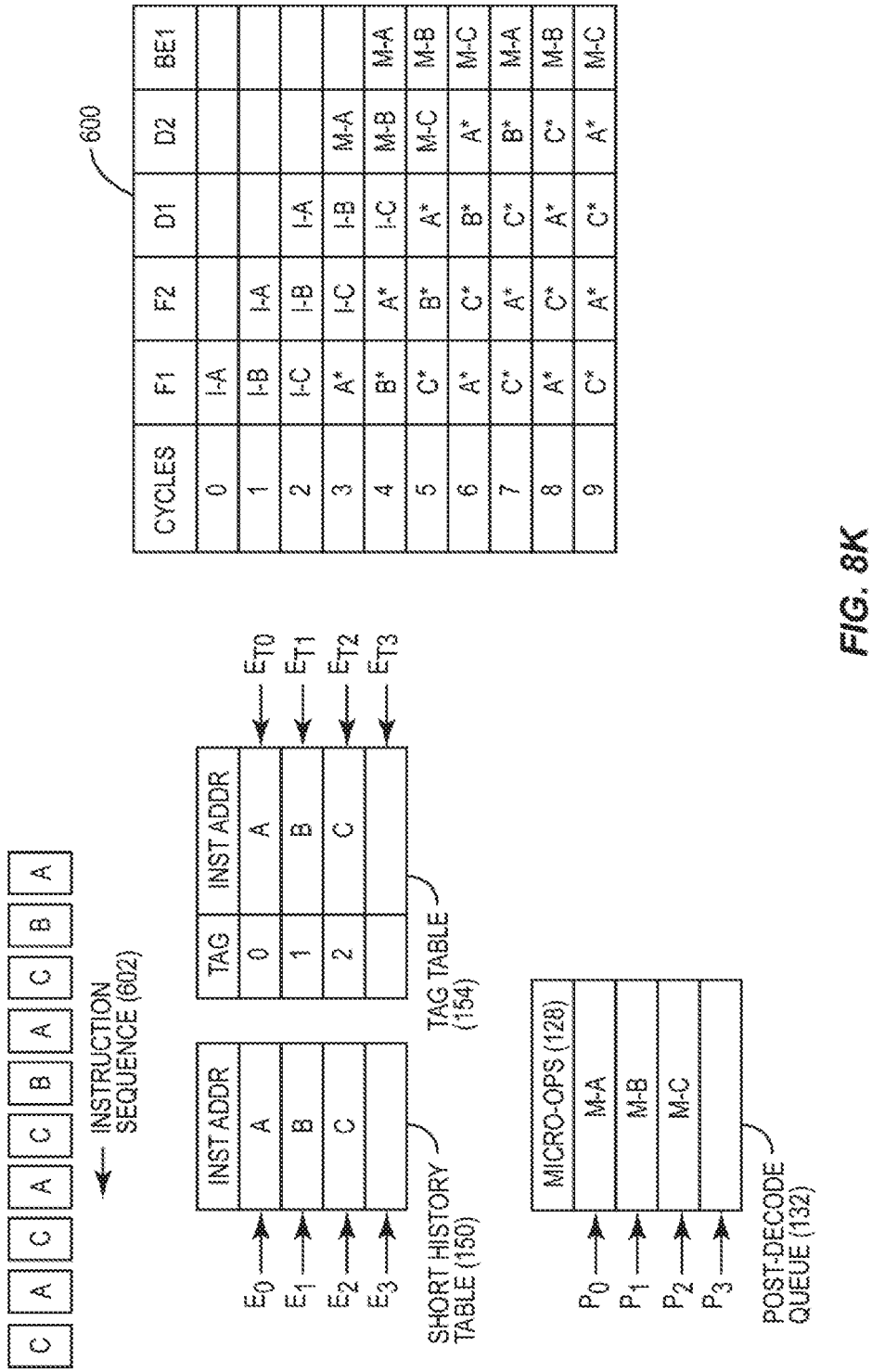

With reference to FIG. 8K, the low resource micro-operation controller 114 receives the instruction address 108 "C" for the next instruction 116 in the instruction sequence 602 in block 402. The short history controller 148 determines that the instruction address 108 "C" is stored in the short history table 150 in block 404. Thus, the short history controller 148 provides the pointer 146 "C*" to the instruction fetch circuit 110 in block 416. The short history controller 148 also updates the least recently used status of the short history table 150 in block 418, prevents a fetch and decode in blocks 420, 422, respectively, and the process 400 is done in block 424. With reference to cycle 9 in FIG. 8K, in response to providing the pointer 146 "C*," the pointer 146 "C*" is provided to the first fetch stage F1, the pointer 146 "A*" proceeds to the second fetch stage F2, the pointer 146 "C*" proceeds to the first decode queue D1, and the pointer 146 "A*" proceeds to the second decode stage D2. Additionally, as previously noted, the micro-ops 128 "M-C" are provided from the entry $P_2$ of the post-decode queue 132 to the first back-end stage BE1 for execution.

Further, in response to receiving the pointer 146 "A*" at the post-decode queue 132 in block 502, the tag controller 152 determines that the pointer 146 "A*" is a pointer 146 in block 504. The tag controller 152 then determines that the pointer 146 "A*" corresponds to an instruction address 108 stored in entry $E_0$ in the tag table 154 in block 514. Thus, the micro-ops 128 "M-A" are still stored in the post-decode queue 132. In response to determining that pointer 146 "A*" corresponds to the entry $E_{T0}$, the tag controller 152 provides the micro-ops 128 "M-A" from the entry $P_0$ of the post-decode queue 132 to the first back-end stage BE1 for execution in block 516 (not shown).

In contrast to generating a hit in the tag table 154 as described above, the tag controller 152 is configured to perform alternative steps if the tag controller 152 determines that the pointer 146 does not correspond to an entry $E_{T0}$-$E_{T3}$ in the tag table 154 in block 514. In this aspect, in response to detecting a miss in block 514, the tag controller 152 flushes queues corresponding to the front-end instruction stage 112 (block 518 in FIG. 7A). The tag controller 152 also flushes the short history table 150 and the tag table 154 (block 520 in FIG. 7A). Further, the tag controller 152 instructs the instruction fetch circuit 110 to fetch the instruction 116 corresponding to the received instruction address 108 (block 522 in FIG. 7A). Following initiation of a fetch, the process 500 is done with the iteration (block 524 in FIG. 7A). Additionally, in response to a miss in block 514 in other aspects, the tag controller 152 can be configured to instruct the instruction decode circuit 126 to stop operation, and instruct the instruction fetch circuit 110 to fetch the instruction 116 corresponding to the received instruction address 108.

The elements described herein are sometimes referred to as means for performing particular functions. In this regard, the short history controller 148 is sometimes referred to herein as a "means for receiving an instruction address for a next instruction to be fetched for execution into an instruction pipeline in an instruction processing system." The short history controller 148 is also sometimes referred to herein as a "means for determining if the received instruction address corresponds to a stored instruction address in a short history table." Further, the short history controller 148 is sometimes referred to herein as a "means for responsive to determining that the received instruction address corresponds to a stored instruction address in the short history table, providing a pointer corresponding to the stored instruction address in the short history table to an instruction fetch circuit, wherein the pointer corresponds to an entry in a post-decode queue in which micro-operations corresponding to the stored instruction address are stored." The tag controller is sometimes referred to herein as a "means for monitoring the post-decode queue." Additionally, the tag controller 152 is sometimes referred to herein as a "means for responsive to the post-decode queue receiving the pointer, providing the micro-operations corresponding to the stored instruction address from the entry in the post-decode queue for execution."

Providing references to previously decoded instructions of recently-provided instructions to be executed by a processor according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
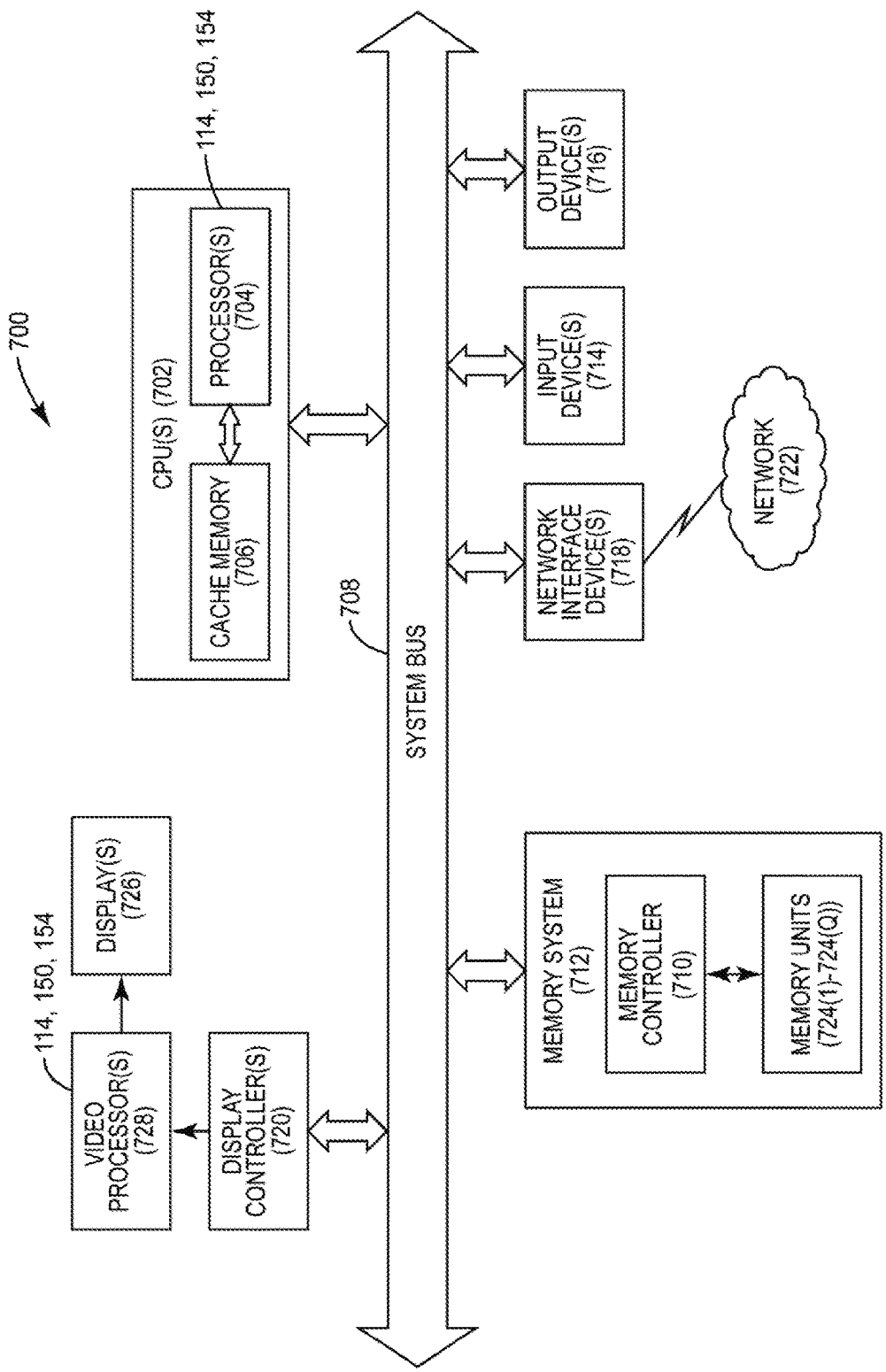
FIG. 9 is a block diagram of an exemplary processor-based system that can include the low resource micro-operation controller in FIG. 1.

In this regard, FIG. 9 illustrates an example of a processor-based system 700 that can employ processing systems that may include the low resource micro-operation controller 114, the short history table 150, and the tag table 154 illustrated in FIG. 1. In this example, the processor-based system 700 includes one or more central processing units (CPUs) 702, each including one or more processors 704, which can include the low resource micro-operation controller 114, the short history table 150, and the tag table 154. The CPU(s) 702 may have cache memory 706 coupled to the processor(s) 704 for rapid access to temporarily stored data. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device. Although not illustrated in FIG. 9, multiple system buses 708 could be provided, wherein each system bus 708 constitutes a different fabric.

Other master and slave devices can be connected to the system bus 708. As illustrated in FIG. 9, these devices can include a memory system 712, one or more input devices 714, one or more output devices 716, one or more network interface devices 718, and one or more display controllers 720, as examples. The input device(s) 714 can include any type of input device, including but not limited to input keys, switches, voice processors, etc. The output device(s) 716 can include any type of output device, including but not limited to audio, video, other visual indicators, etc. The network interface device(s) 718 can be any device configured to allow exchange of data to and from a network 722. The network 722 can be any type of network, including but not limited to a wired or wireless network, a private or public network, a local area network (LAN), a wireless local area network (WLAN), a wide area network (WAN), a BLUETOOTH™ network, or the Internet. The network interface device(s) 718 can be configured to support any type of communications protocol desired. The memory system 712 can include one or more memory units 724(1)-724(Q).

The CPU(s) 702 may also be configured to access the display controller(s) 720 over the system bus 708 to control information sent to one or more displays 726. The display controller(s) 720 sends information to the display(s) 726 to be displayed via one or more video processors 728, which can include the low resource micro-operation controller 114, the short history table 150, and the tag table 154, which process the information to be displayed into a format suitable for the display(s) 726. The display(s) 726 can include any type of display, including but not limited to a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A low resource micro-operation controller, comprising:
   a short history controller configured to:
      receive an instruction address for a next instruction to be fetched for execution into an instruction pipeline in an instruction processing system;
      determine if the received instruction address corresponds to a stored instruction address in a short history table; and
      responsive to determining that the received instruction address corresponds to a stored instruction address in the short history table, provide a pointer corresponding to the stored instruction address in the short history table to an instruction fetch circuit, wherein the pointer corresponds to an entry in a post-decode queue in which micro-operations corresponding to the stored instruction address are stored; and
   a tag controller configured to:
      monitor the post-decode queue; and
      responsive to the post-decode queue receiving the pointer, provide the micro-operations corresponding to the stored instruction address from the entry in the post-decode queue for execution.

2. The low resource micro-operation controller of claim 1, wherein the short history controller is further configured to, responsive to determining that the received instruction address corresponds to a stored instruction address in the short history table, update a least recently used status of the short history table.

3. The low resource micro-operation controller of claim 1, wherein the short history controller is further configured to:
   responsive to determining that the received instruction address corresponds to a stored instruction address in the short history table, prevent the instruction fetch circuit from fetching an instruction corresponding to the received instruction address; and
   responsive to determining that the received instruction address corresponds to a stored instruction address in the short history table, prevent an instruction decode circuit from decoding an instruction corresponding to the received instruction address.

4. The low resource micro-operation controller of claim 1, wherein the short history controller is further configured to, responsive to determining that the received instruction address does not correspond to a stored instruction address in the short history table, instruct the instruction fetch circuit to fetch an instruction corresponding to the received instruction address.

5. The low resource micro-operation controller of claim 4, wherein the short history controller is further configured to, responsive to determining that the received instruction address does not correspond to a stored instruction address in the short history table, store the received instruction address in the short history table.

6. The low resource micro-operation controller of claim 5, wherein the short history controller is configured to store the received instruction address in the short history table by being configured to:
   determine if an entry in the short history table is free;
   responsive to determining that an entry in the short history table is free, store the received instruction address in the free entry; and
   responsive to determining that an entry in the short history table is not free, store the received instruction address in a least recently used entry of the short history table.

7. The low resource micro-operation controller of claim 1, wherein the tag controller is configured to provide the micro-operations corresponding to the stored instruction address from the entry in the post-decode queue for execution by being configured to:
  responsive to the post-decode queue receiving a pointer, determine if the pointer corresponds to an entry stored in a tag table; and
  responsive to determining that the pointer corresponds to an entry stored in the tag table, provide the micro-operations from an entry in the post-decode queue corresponding to a tag of the entry in the tag table.

8. The low resource micro-operation controller of claim 7, wherein the tag controller is further configured to, responsive to determining that the pointer does not correspond to an entry in the tag table:
  flush queues corresponding to a front-end instruction stage of the instruction pipeline;
  flush the short history table;
  flush the tag table; and
  instruct the instruction fetch circuit to fetch an instruction corresponding to the received instruction address.

9. The low resource micro-operation controller of claim 7, wherein the tag controller is further configured to, responsive to the post-decode queue receiving the micro-operations:
  determine if an entry in the tag table is free;
  responsive to determining that an entry in the tag table is free, store a tag and the instruction address corresponding to the micro-operations in the free entry of the tag table; and
  responsive to determining that an entry in the tag table is not free, store the tag and the instruction address corresponding to the micro-operations in a least recently used entry of the tag table.

10. The low resource micro-operation controller of claim 7, wherein the tag controller is further configured to, responsive to determining that the pointer does not correspond to an entry stored in the tag table:
  instruct an instruction decode circuit to stop operation; and
  instruct the instruction fetch circuit to fetch an instruction corresponding to the received instruction address.

11. The low resource micro-operation controller of claim 1, wherein the pointer comprises:
  the received instruction address; and
  a pointer indicator indicating a pointer structure.

12. The low resource micro-operation controller of claim 1, wherein the pointer comprises:
  an offset value indicating a number of instruction addresses not corresponding to the received instruction address received by the low resource micro-operation controller between the received instruction address and a most recent previous instance of the received instruction address; and
  a pointer indicator indicating a pointer structure.

13. The low resource micro-operation controller of claim 1 integrated into an integrated circuit (IC).

14. The low resource micro-operation controller of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

15. A low resource micro-operation controller, comprising:
  a means for receiving an instruction address for a next instruction to be fetched for execution into an instruction pipeline in an instruction processing system;
  a means for determining if the received instruction address corresponds to a stored instruction address in a short history table;
  a means for responsive to determining that the received instruction address corresponds to a stored instruction address in the short history table, providing a pointer corresponding to the stored instruction address in the short history table to an instruction fetch circuit, wherein the pointer corresponds to an entry in a post-decode queue in which micro-operations corresponding to the stored instruction address are stored;
  a means for monitoring the post-decode queue; and
  a means for responsive to the post-decode queue receiving the pointer, providing the micro-operations corresponding to the stored instruction address from the entry in the post-decode queue for execution.

16. A method for providing a pointer to previously decoded instructions of recently-provided instructions to be executed by a processor, comprising:
  receiving, by a short history controller of the processor, an instruction address for a next instruction to be fetched for execution into an instruction pipeline in an instruction processing system;
  determining, by the short history controller, if the received instruction address corresponds to a stored instruction address in a short history table;
  responsive to determining, by the short history controller, that the received instruction address corresponds to a stored instruction address in the short history table, providing, by the short history controller, a pointer corresponding to the stored instruction address in the short history table to an instruction fetch circuit, wherein the pointer corresponds to an entry in a post-decode queue in which micro-operations corresponding to the stored instruction address are stored;
  monitoring, by a tag controller of the processor, the post-decode queue; and
  responsive to the post-decode queue receiving the pointer, providing, by the tag controller, the micro-operations corresponding to the stored instruction address from the entry in the post-decode queue for execution.

17. The method of claim 16 further comprising, responsive to determining that the received instruction address corresponds to a stored instruction address in the short history table, updating a least recently used status of the short history table.

18. The method of claim 16, further comprising:
  responsive to determining that the received instruction address corresponds to a stored instruction address in the short history table, preventing the instruction fetch circuit from fetching an instruction corresponding to the received instruction address; and
  responsive to determining that the received instruction address corresponds to a stored instruction address in the short history table, preventing an instruction decode circuit from decoding an instruction corresponding to the received instruction address.

19. The method of claim 16 further comprising, responsive to determining that the received instruction address does not correspond to a stored instruction address in the short history table, instructing the instruction fetch circuit to fetch an instruction corresponding to the received instruction address.

20. The method of claim 19 further comprising, responsive to determining that the received instruction address does not correspond to a stored instruction address in the short history table, storing the received instruction address in the short history table.

21. The method of claim 20, wherein storing the received instruction address in the short history table comprises:
determining if an entry in the short history table is free;
responsive to determining that an entry in the short history table is free, storing the received instruction address in the free entry; and
responsive to determining that an entry in the short history table is not free, storing the received instruction address in a least recently used entry of the short history table.

22. The method of claim 16, wherein providing the micro-operations corresponding to the stored instruction address from the entry in the post-decode queue for execution comprises:
responsive to the post-decode queue receiving the pointer, determining if the pointer corresponds to an entry stored in a tag table; and
responsive to determining that the pointer corresponds to an entry stored in the tag table, providing the micro-operations from an entry in the post-decode queue corresponding to a tag of the entry in the tag table.

23. The method of claim 22 further comprising, responsive to determining that the pointer does not correspond to an entry stored in the tag table:
flushing queues corresponding to a front-end instruction stage of the instruction pipeline;
flushing the short history table;
flushing the tag table; and
instructing the instruction fetch circuit to fetch an instruction corresponding to the received instruction address.

24. The method of claim 23, further comprising, responsive to the post-decode queue receiving the micro-operations:
determining if an entry in the tag table is free;
responsive to determining that an entry in the tag table is free, storing a tag and the instruction address corresponding to the micro-operations in the free entry of the tag table; and
responsive to determining that an entry in the tag table is not free, storing the tag and the instruction address corresponding to the micro-operations in a least recently used entry of the tag table.

25. The method of claim 22, further comprising, responsive to determining that the pointer does not correspond to an entry stored in the tag table:
instructing an instruction decode circuit to stop operating; and
instructing the instruction fetch circuit to fetch an instruction corresponding to the received instruction address.

26. An instruction processing system for a processor, comprising:
one or more instruction pipelines each comprising an instruction fetch circuit configured to fetch instructions into a fetch queue, an instruction decode circuit configured to decode instructions fetched by the instruction fetch circuit, and an execution circuit configured to execute micro-operations of the decoded instructions in a post-decode queue; and
a low resource micro-operation controller, comprising:
a short history controller, configured to:
receive an instruction address for a next instruction to be fetched for execution into one of the one or more instruction pipelines;
determine if the received instruction address corresponds to a stored instruction address in a short history table; and
responsive to determining that the received instruction address corresponds to a stored instruction address in the short history table, provide a pointer corresponding to the stored instruction address in the short history table to the instruction fetch circuit, wherein the pointer corresponds to an entry in the post-decode queue in which the micro-operations corresponding to the stored instruction address are stored; and
a tag controller configured to:
monitor the post-decode queue; and
responsive to the post-decode queue receiving the pointer, provide the micro-operations corresponding to the stored instruction address from the entry in the post-decode queue for execution.

27. The instruction processing system of claim 26, wherein the short history controller is further configured to, responsive to determining that the received instruction address does not correspond to a stored instruction address in the short history table, instruct the instruction fetch circuit to fetch an instruction corresponding to the received instruction address.

28. The instruction processing system of claim 26, wherein the tag controller is configured to provide the micro-operations corresponding to the stored instruction address from the entry in the post-decode queue for execution by being configured to:
responsive to the post-decode queue receiving a pointer, determine if the pointer corresponds to an entry stored in a tag table; and
responsive to determining that the pointer corresponds to an entry stored in the tag table, provide the micro-operations from an entry in the post-decode queue corresponding to a tag of the entry in the tag table.

29. The instruction processing system of claim 28, wherein the tag controller is further configured to, responsive to determining that the pointer does not correspond to an entry stored in the tag table:
flush queues corresponding to a front-end instruction stage of the one or more instruction pipelines;
flush the short history table;
flush the tag table; and
instruct the instruction fetch circuit to fetch an instruction corresponding to the received instruction address.

30. The instruction processing system of claim 28, wherein the tag controller is further configured to, responsive to the post-decode queue receiving the micro-operations:
determine if an entry in the tag table is free;
responsive to determining that an entry in the tag table is free, store a tag and the instruction address corresponding to the micro-operations in the free entry of the tag table; and
responsive to determining that an entry in the tag table is not free, store the tag and the instruction address corresponding to the micro-operations in a least recently used entry of the tag table.

* * * * *